(12) United States Patent
Yamamoto et al.

(10) Patent No.: US 10,895,557 B2
(45) Date of Patent: Jan. 19, 2021

(54) LINEAR-SCAN ULTRASONIC INSPECTION APPARATUS AND LINEAR-SCAN ULTRASONIC INSPECTION METHOD

(71) Applicants: KABUSHIKI KAISHA TOSHIBA, Minato-ku (JP); Toshiba Energy Systems & Solutions Corporation, Kawasaki (JP)

(72) Inventors: Setsu Yamamoto, Yokohama (JP); Azusa Sugawara, Kawasaki (JP); Jun Semboshi, Yokohama (JP); Kentaro Tsuchihashi, Yokohama (JP); Masaru Otsuka, Ota (JP)

(73) Assignees: KABUSHIKI KAISHA TOSHIBA, Minato-ku (JP); Toshiba Energy Systems & Solutions Corporation, Kawasaki (JP)

( * ) Notice: Subject to any disclaimer, the term of this patent is extended or adjusted under 35 U.S.C. 154(b) by 218 days.

(21) Appl. No.: 16/112,183

(22) Filed: Aug. 24, 2018

(65) Prior Publication Data

US 2019/0064120 A1   Feb. 28, 2019

(30) Foreign Application Priority Data

Aug. 25, 2017 (JP) ................................. 2017-162441
Mar. 5, 2018 (JP) ................................. 2018-038652

(51) Int. Cl.
  *G01N 29/26* (2006.01)
  *G01N 29/06* (2006.01)
  (Continued)

(52) U.S. Cl.
  CPC ......... *G01N 29/262* (2013.01); *G01N 29/041* (2013.01); *G01N 29/043* (2013.01);
  (Continued)

(58) Field of Classification Search
  CPC .. G01N 29/262; G01N 29/041; G01N 29/043; G01N 29/0645; G01N 29/069;
  (Continued)

(56) References Cited

U.S. PATENT DOCUMENTS 9,453,819 B2    9/2016 Yamamoto et al.
2006/0004287 A1*  1/2006 Rigby ................. G01S 7/52025
                                              600/437

(Continued)

FOREIGN PATENT DOCUMENTS

| JP | 2011-53040 | A |   | 3/2011 |           |
|----|------------|---|---|--------|-----------|
| JP | 5889742    | B2 |  | 2/2016 |           |
| KR | 20130014822 | A | * | 2/2013 | ........... G10K 11/346 |

OTHER PUBLICATIONS

KR-20130014822-A (Year: 2013).*

(Continued)

*Primary Examiner* — Alexander A Mercado
*Assistant Examiner* — Monica S Young
(74) *Attorney, Agent, or Firm* — Oblon, McClelland, Maier & Neustadt, L.L.P.

(57) ABSTRACT

According to an embodiment, a linear-scan ultrasonic inspection apparatus comprises: an ultrasonic array probe having ultrasonic elements aligned in a first direction; a delay-time calculator configured to calculate, referring to the surface shape of the test object, values of delay time of at least one of transmitting and receiving ultrasonic wave; an overlapping-region adjustor configured to set conditions for generating an image of an overlapping region; and an integrated-image generator configured to generate first image data of a region including the overlapping region. The overlapping-region adjustor is configured to set the conditions of the surface shape to be referred to the delay-time calculator in calculating the values of the delay time at either the first-probe setting position or the second-probe setting (Continued)

position as both of a first acquired shape obtained at the first-probe setting position and a second acquired shape obtained at the second-probe setting position.

8 Claims, 31 Drawing Sheets
(1 of 31 Drawing Sheet(s) Filed in Color)

(51) Int. Cl.
    *G01N 29/04*     (2006.01)
    *G01N 29/265*     (2006.01)
    *G01N 29/24*     (2006.01)
    *G01N 29/34*     (2006.01)

(52) U.S. Cl.
    CPC ....... *G01N 29/069* (2013.01); *G01N 29/0645* (2013.01); *G01N 29/2468* (2013.01); *G01N 29/265* (2013.01); *G01N 29/341* (2013.01); *G01N 2291/044* (2013.01); *G01N 2291/106* (2013.01); *G01N 2291/269* (2013.01); *G01N 2291/2638* (2013.01)

(58) Field of Classification Search
    CPC ............. G01N 29/2468; G01N 29/265; G01N 29/341; G01N 2291/044; G01N 2291/106; G01N 2291/2638; G01N 2291/269
    USPC .......................................................... 73/618
    See application file for complete search history.

(56) References Cited

U.S. PATENT DOCUMENTS

| | | | | |
|---|---|---|---|---|
| 2010/0106431 A1* | 4/2010 | Baba | .................. | G01N 29/04 702/39 |
| 2010/0251822 A1* | 10/2010 | Isobe | .................. | G01N 29/069 73/606 |
| 2011/0166807 A1* | 7/2011 | Kitazawa | ............ | G01N 29/0663 702/56 |
| 2012/0245468 A1* | 9/2012 | Miyachi | .............. | G01S 7/52049 600/447 |
| 2013/0014587 A1 | 1/2013 | Yamamoto et al. | | |
| 2013/0298682 A1* | 11/2013 | Motzer | ................ | G01N 29/225 73/618 |
| 2014/0005840 A1* | 1/2014 | Motzer | ................ | G01N 29/225 700/282 |
| 2014/0140167 A1* | 5/2014 | Hunter | .................. | G01N 29/07 367/7 |
| 2014/0283611 A1 | 9/2014 | Habermehl et al. | | |
| 2015/0141831 A1* | 5/2015 | Yamamoto | ........... | A61B 8/4488 600/447 |
| 2015/0196280 A1* | 7/2015 | Yamamoto | ........... | A61B 8/5269 600/440 |
| 2015/0320398 A1* | 11/2015 | Honjo | .................... | A61B 8/145 600/447 |
| 2016/0367224 A1* | 12/2016 | Yamamoto | ............... | A61B 8/14 |

OTHER PUBLICATIONS

Extended European Search Report dated Jan. 2, 2019 in Patent Application No. 18189957.6, 8 pages.

Yamamoto, S. et al. "Phased array ultrasonic inspection technique for cast austenitic stainless steel parts of nuclear power plants" Proceedings of the 24$^{th}$ International Conference on Nuclear Engineering, The American Society of Mechanical Engineers, vol. 1, XP009510073, 2016, 7 pages.

* cited by examiner

First acquired shape Sa as surface shape of test object ........
obtained at first probe setting position Second acquired shape Sb as surface shape of test object — — -
obtained at second probe setting position FIG. 20
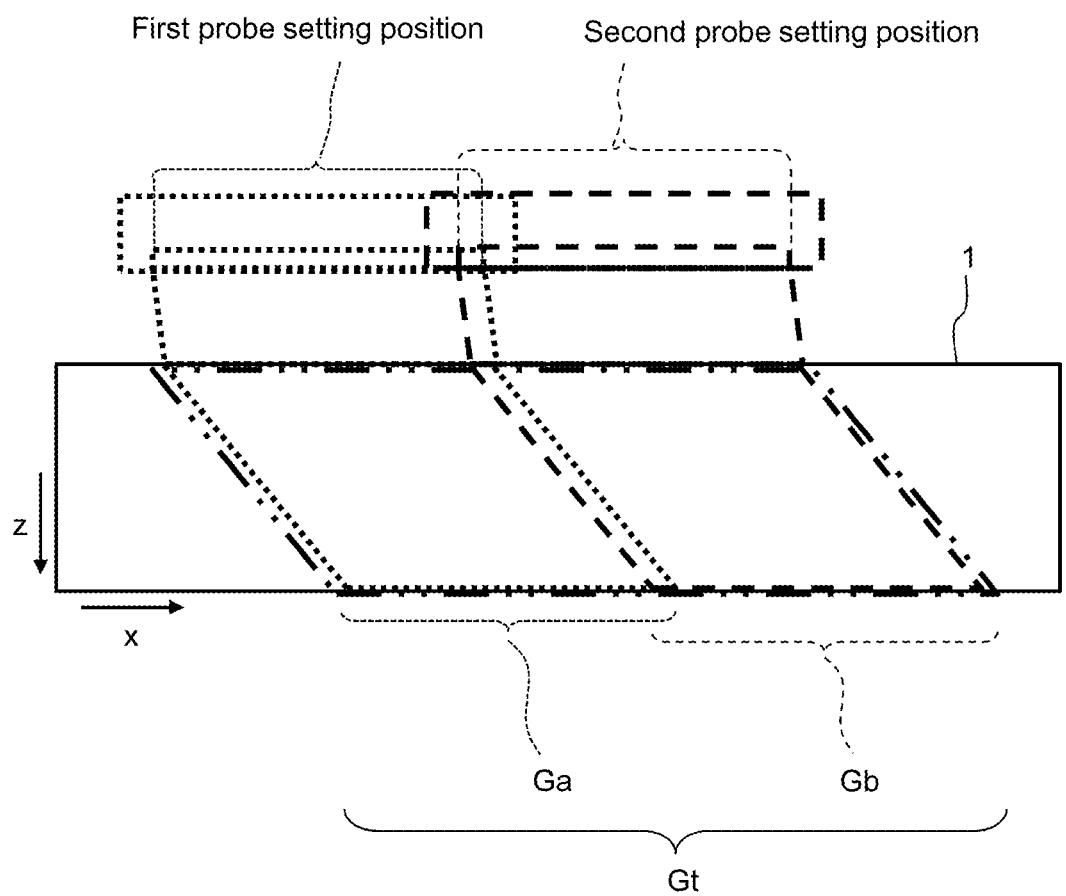
Lengthwise-depth test image Ga at first probe setting position 
Lengthwise-depth test image Gb at second probe setting position 
Lengthwise-depth integrated image Gt 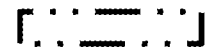

FIG. 21
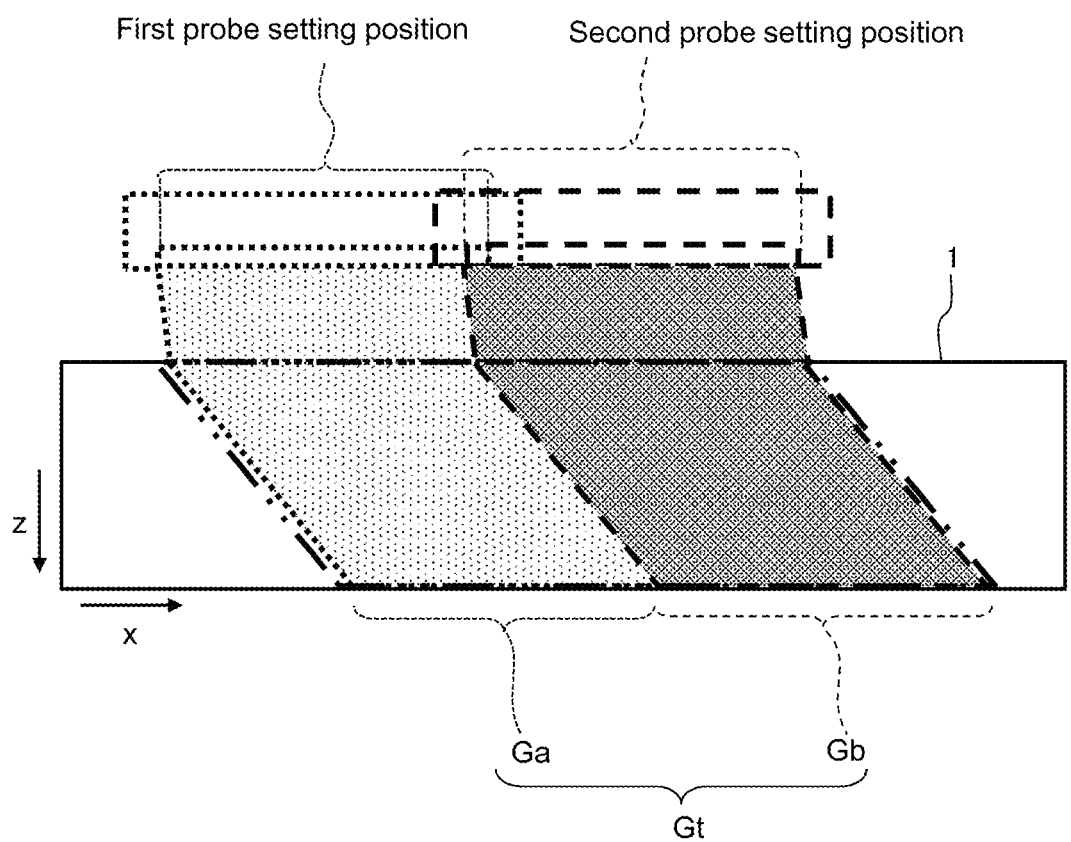
Lengthwise-depth test image Ga at first probe setting position 
Lengthwise-depth test image Gb at second probe setting position 
Lengthwise-depth integrated image Gt 

FIG. 22

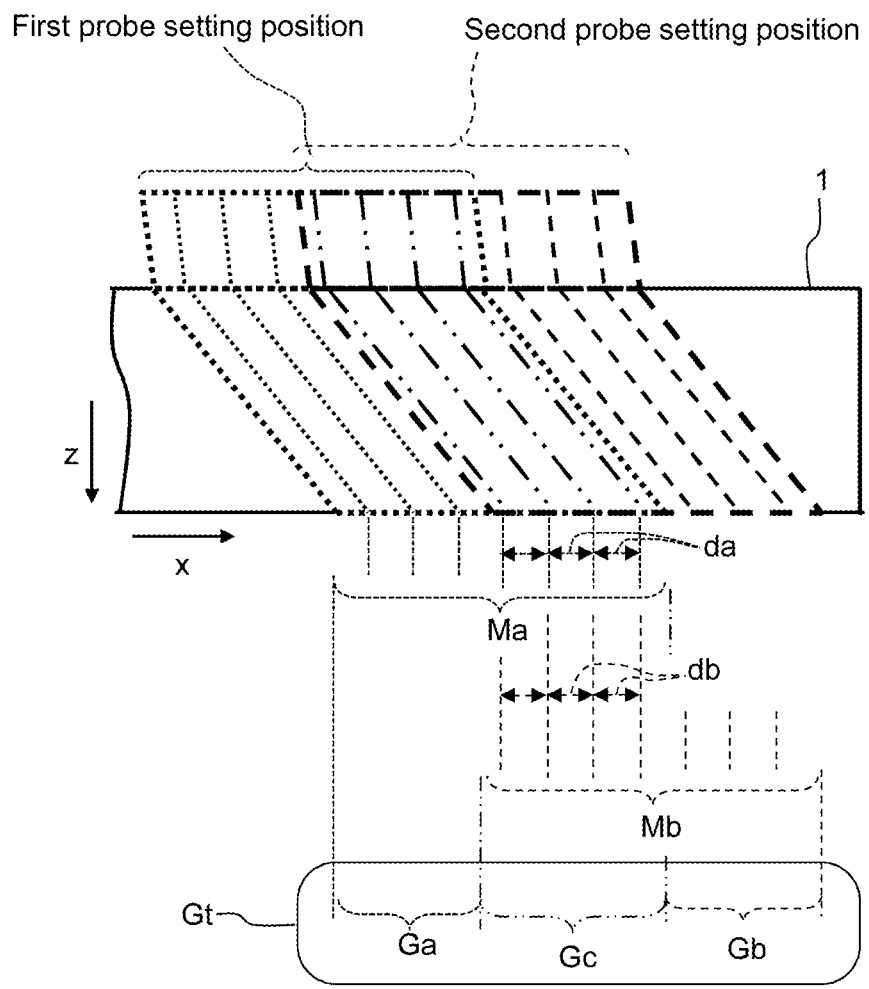

Lengthwise-depth test image Ga at first probe setting position  ··········
Lengthwise-depth test image Gb at second probe setting position  — — —
Lengthwise-depth integrated image Gc at overlapping part  — ·· —

Synthesized waveform Ma at first probe setting position  ················
Synthesized waveform Mb at second probe setting position  - - - - -
Synthesized waveform Mc  — ·· — ·

FIG. 23

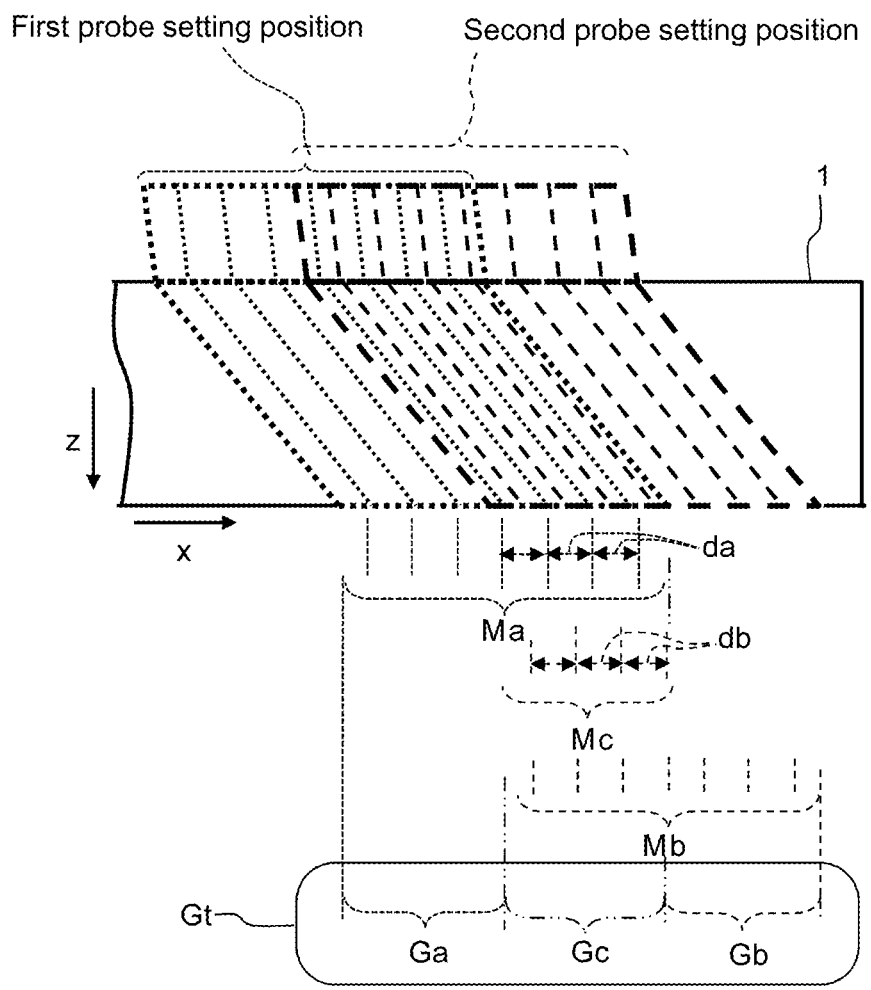

Lengthwise-depth test image Ga at first probe setting position ··········
Lengthwise-depth test image Gb at second probe setting position — — —
Lengthwise-depth integrated image Gc at overlapping part ▬ · · ▬
Synthesized waveform Ma at first probe setting position ················
Synthesized waveform Mb at second probe setting position - - - - -
Synthesized waveform Mc — ·· — ·

FIG. 24

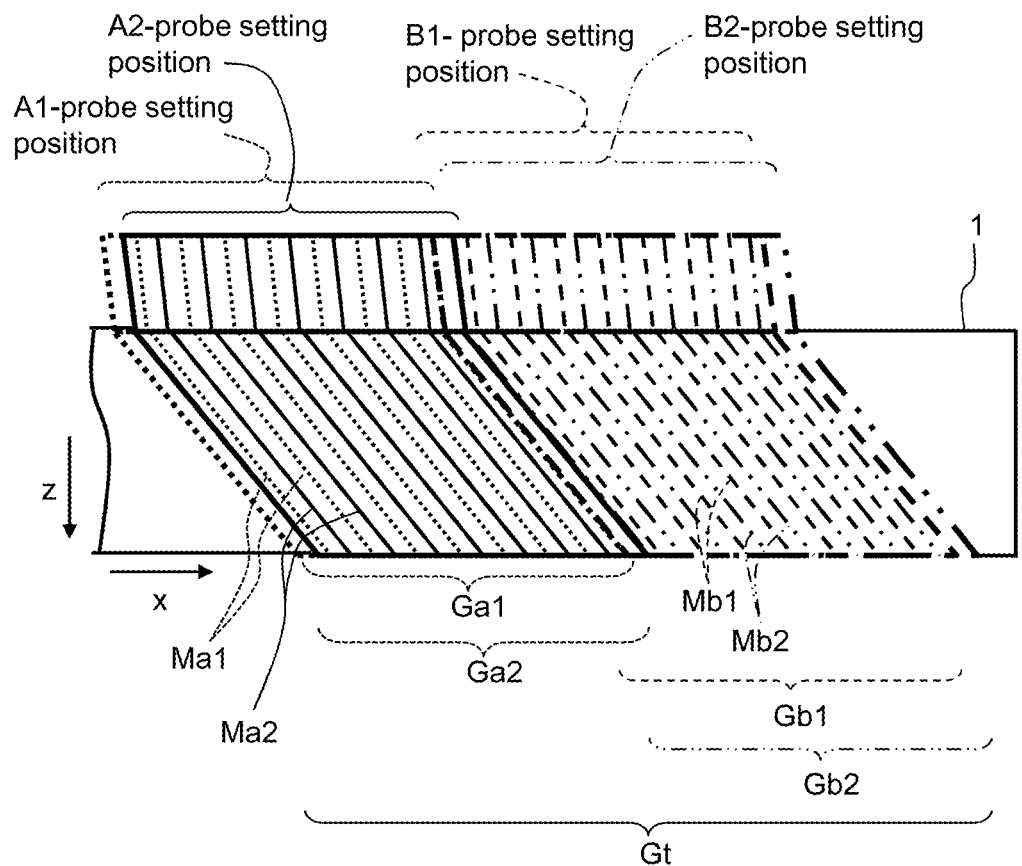

Lengthwise-depth test image Ga1 at first probe setting position  ............
Lengthwise-depth test image Ga2 at 1A probe setting position  ⎯⎯⎯⎯
Lengthwise-depth test image GB1 at second probe setting position  ⎯ ⎯ ⎯ ⎯
Lengthwise-depth test image GB2 at 2A probe setting position  ⎯ ⋅ ⋅ ⎯
Synthesized waveform Ma1 at first probe setting position  ⋯⋯⋯⋯
Synthesized waveform Ma2 at 1A probe setting position  ⎯⎯⎯⎯
Synthesized waveform Mb1 at second probe setting position  ⋅ ⎯ ⎯ ⎯
Synthesized waveform Mb2 at 2A probe setting position  ⋅⋅ ⎯ ⋅⋅ ⎯

Synthesized waveform Ma at first probe setting position ..............

Synthesized waveform Mb at second probe setting position  – – – – – –

Synthesized waveform Mc at third probe setting position  — ·· — ·· —

Lengthwise-widthwise-depth test image Gxyza
at first probe setting position

Lengthwise-widthwise-depth test image Gxyzb
at second probe setting position

Lengthwise-widthwise-depth test image Gxyza
at first probe setting position

Lengthwise-widthwise-depth test image Gxyzb
at second probe setting position

Inspection of nozzle
in circumferential direction ( r -θ direction)

Inspection of nozzle
in axial direction ( r -z direction)

LINEAR-SCAN ULTRASONIC INSPECTION APPARATUS AND LINEAR-SCAN ULTRASONIC INSPECTION METHOD

CROSS REFERENCE TO RELATED APPLICATIONS

The present application is based upon and claims the benefit of priority from Japanese Application No. 2017-162441 filed on Aug. 25, 2017, and Japanese Application No. 2018-038652 filed on Mar. 5, 2018, the entire contents of each of which are incorporated herein by reference.

FIELD

The embodiments of this invention relate to a linear-scan ultrasonic inspection apparatus and a linear-scan ultrasonic inspection method.

BACKGROUND

A technique of ultrasonic testing (UT) can confirm, in a non-destructive way, whether a structure is flawless both outside and inside, and has therefore become a technique indispensable in various technical fields. Phased array ultrasonic testing (PAUT) has a broad industrial use. In PAUT, piezoelectric elements, which are used as small ultrasonic elements for transmitting and receiving ultrasonic waves, are arranged and transmit ultrasonic waves, at different time intervals delayed from each other, thereby to generate waves having a given waveform. Unlike the inspection using a monocular probe, the phased array ultrasonic inspection can scan, at a time, a broad area at a plurality of angles, or scan a test object having a complicated shape. Hence, the phased array ultrasonic inspection is very advantageous in that the man-hours required can be reduced.

In the linear scanning, elements to drive are electron-scanned while a phased array is forming an ultrasonic beam in a specific direction. In the linear scanning, the more channels the array probe has, the larger area of the image is obtained in the depth direction by linear scanning, and the more precisely the image will be evaluated.

However, if the array probe has a small number of elements due to, for example, the limited probe-setting position, the linear scanning cannot attain a liner-scanned image that is large enough to be evaluated. Therefore, sector scanning of transmitting beams while scanning the array probe in a fan-shaped plane is used in the main. In the case of the sector scanning, the sound speed changes in accordance with the beam-scanning angle if the object material has anisotropy. Hence, the linear scanning may be effective in some cases, because measurement is possible at the same angle.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 20 is a conceptual, sectional longitudinal view explaining a first method of overlapping ultrasonic test images in the linear-scan ultrasonic inspection apparatus according to the first embodiment.

FIG. 21 is a conceptual, sectional longitudinal view explaining a second method of overlapping ultrasonic test images in the linear-scan ultrasonic inspection apparatus according to the first embodiment.

FIG. 22 is conceptual, sectional longitudinal view explaining a third method of overlapping ultrasonic test images in the linear-scan ultrasonic inspection apparatus according to the first embodiment.

FIG. 23 is conceptual, sectional longitudinal view explaining a fourth method of overlapping ultrasonic test images in the linear-scan ultrasonic inspection apparatus according to the first embodiment.

FIG. 24 is conceptual, sectional longitudinal view explaining a fifth method of overlapping ultrasonic test images in the linear-scan ultrasonic inspection apparatus according to the first embodiment.

DETAILED DESCRIPTION

Figure 1:
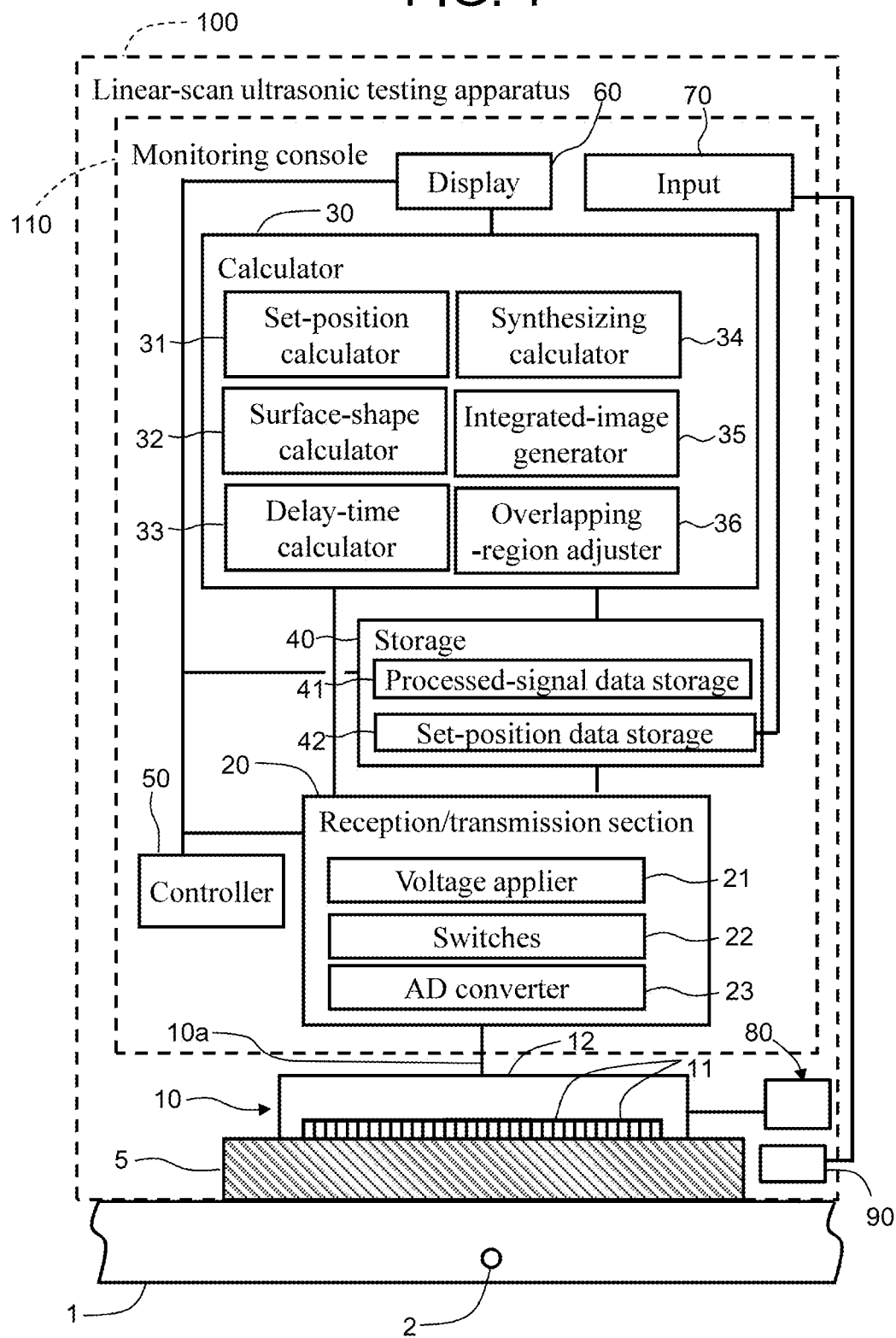
FIG. 1 is a block diagram showing the configuration of a linear-scan ultrasonic inspection apparatus according to a first embodiment.

An object of this invention is to achieve linear scanning in a wide range.

According to an aspect of the present invention, there is provided a linear-scan ultrasonic inspection apparatus comprising: an ultrasonic array probe having a plurality of ultrasonic elements aligned in a first direction, each of the ultrasonic elements being configured to transmit and receive ultrasonic wave in a test object; a delay-time calculator configured to calculate, referring to the surface shape of the test object, values of delay time of at least one of transmitting and receiving the ultrasonic wave with each of the ultrasonic elements; an overlapping-region adjustor configured to set conditions for generating an image of an overlapping region between a first-probe setting position and a second-probe setting position of the ultrasonic array probe, the second-probe setting position being shifted in the first direction from the first-probe setting position; and an integrated-image generator configured to generate first image data of a region including the overlapping region, the first image data expanding in the first direction and the depth direction of the test object, wherein the overlapping-region adjustor is configured to set the conditions of the surface shape to be referred to the delay-time calculator in calculating the values of the delay time at either the first-probe setting position or the second-probe setting position as both of a first acquired shape obtained at the first-probe setting position and a second acquired shape obtained at the second-probe setting position.

According to another aspect of the present invention, there is provided a linear-scan ultrasonic inspection method comprising: a first test-data acquiring step of storing in a storage a first inspection data obtained by an ultrasonic array probe having a plurality of ultrasonic elements at a first-probe setting position on the surface of a test object; a second test-data acquiring step of storing in the storage a second inspection data obtained by the ultrasonic array probe at a second-probe setting position including an overlapping region overlapping the first-probe setting position in a first direction along a surface of a test object; a condition setting step of setting in an overlapping-region adjustor conditions of generating image data for the overlapping region; and an image-data generating step of generating with an integrated-image generator inspection image data corresponding to the first-probe setting position and the second-probe setting position including the overlapping region, based on the first ultrasonic test data, the second ultrasonic test data and the conditions, wherein the image-data generating step includes a delay time calculation step of calculating with a delay-time calculator values of delay time of at least one of transmitting and receiving ultrasonic wave in the test object with each of the ultrasonic elements, referring to the surface shape of the test object; and the condition setting step includes a step of setting the conditions of the surface shape to be referred to the delay-time calculator in calculating the values of the delay time at either the first-probe setting position or the second-probe setting position as both of a first acquired shape obtained at the first-probe setting position and a second acquired shape obtained at the second-probe setting position.

Hereinafter, with reference to the accompanying drawings, embodiments of a linear-scan ultrasonic inspection apparatus and a linear-scan ultrasonic inspection method will be described. The same or similar portions are represented by the same reference symbols and will not be described repeatedly.

First Embodiment

FIG. 1 is a block diagram showing the configuration of a linear-scan ultrasonic inspection apparatus according to a first embodiment. The linear-scan ultrasonic inspection apparatus 100 has an ultrasonic array probe 10, an array probe driver 80, a shape acquiring unit 90, and a monitoring console 110. The ultrasonic array probe 10 and the monitoring console 110 are connected by a signal transmission line 10a. The shape acquiring unit 90 is connected to an input 70 of the monitoring console 110. The linear-scan ultrasonic inspection apparatus 100 is used to detect the defect 2 in a test object 1, in a non-distractive manner.

The ultrasonic array probe 10 has a plurality of ultrasonic elements 11 (N elements) and a holding unit 12 holding the ultrasonic elements 11. The ultrasonic elements 11 are aligned, linearly arranged in the longitudinal direction with longitudinal prescribed intervals therebetween. Here, an aligning direction of plurality of ultrasonic elements 11 is referred to the longitudinal direction or a lengthwise direction.

The ultrasonic elements 11 are piezoelectric elements made of ceramic, a composite material thereof, or any other material that are able to generate ultrasonic waves by virtue of piezoelectric effect. Alternatively, the ultrasonic elements 11 may be piezoelectric elements made of high molecular film, or may be a mechanism for generating ultrasonic waves. Further, the ultrasonic elements 11 may have a damping member for damping ultrasonic waves, and a part or entirety of the front plate disposed at the transmitting surface. The ultrasonic elements 11 are generally known as "ultrasonic probes."

The ultrasonic elements 11 not only generate ultrasonic waves when a potential difference is applied, but also generate voltage signals on receiving an ultrasonic wave. Thus, the ultrasonic elements 11 have the function of transmitting and receiving ultrasonic waves. The ultrasonic elements 11 are so configured to transmit and receive ultrasonic wave in the test object 1.

The ultrasonic array probe 10 described above has ultrasonic elements 11 which are arranged in a one-dimensional array. The arrangement of the ultrasonic elements nevertheless is not limited to this. For example, the arrangement of the ultrasonic elements may be 1.5-dimensional array probe in which the piezoelectric elements have different widths in the depth direction of a linear array probe, a matrix array probe in which the piezoelectric elements are arranged in two dimensions, a ring array probe in which the piezoelectric elements are arranged concentric with one another, a divided ring array probe formed by dividing the piezoelectric elements of a ring array probe in circumferential direction, a non-uniform array probe having piezoelectric elements in a non-uniform pattern, an arc array probe in which the piezoelectric elements are arranged along an arc, or a spherical array probe in which the piezoelectric elements are arranged on the surface of a sphere.

Moreover, some of those various array probes may be selected and combined for so-called tandem ultrasonic inspection. The various array probes described above include those to be used in air and water if well sealed by caulking or packing.

To test the test object 1, a sound propagation medium 5, also called "wedge," is placed between the ultrasonic array probe 10 and the test object 1. The sound propagation medium 5 is used to transmit ultrasonic waves to the test object 1 at an angle of high-directionality. Such isotropic materials that can guide the ultrasonic waves and have detectable acoustic impedance are used as the sound propagation medium 5. The sound propagation medium 5 may not be used, for example, in the case where the test object 1 has flat surfaces.

As the isotropic sound propagation medium 5, such materials as acryl, polyimide, gel or another high-molecular substance are useful. Such material having acoustic impedance similar or equal to the acoustic impedance of the material of the front plate (not shown) of each ultrasonic elements 11, or material having acoustic impedance similar or equal to the material of the test object 1 can be used as the sound propagation medium 5. Further, such a material having acoustic impedance that changes either gradually or stepwise can be used as the sound propagation medium 5.

Moreover, in order to prevent the multiple reflection waves in the sound propagation medium 5 from influencing the result of the ultrasonic inspection, the sound propagation medium 5 may have damping members arranged inside and outside, may have a corrugated shape to eliminate waves, or may have a multiple-reflection reducing mechanism. In some cases, the sound propagation medium 5 is not shown in the figures illustrating how the ultrasonic waves are transmitted from the ultrasonic array probe 10 to the test object 1.

An acoustic contact medium (not shown) is used at the junctions of a path extending from the ultrasonic array probe 10 to the test object 1. That is, the acoustic contact medium is used at the junction of the ultrasonic array probe 10 and the acoustic propagation medium 5 and at the junction of the acoustic propagation medium 5 and the test object 1. If the acoustic propagation medium 5 is not used, the acoustic contact medium is applied at the junction between the ultrasonic array probe 10 and the test object 1. The acoustic contact medium is substance that can propagate ultrasonic waves such as water, glycerin, machine oil, castor oil, acryl, polystyrene or gel.

Figure 2:
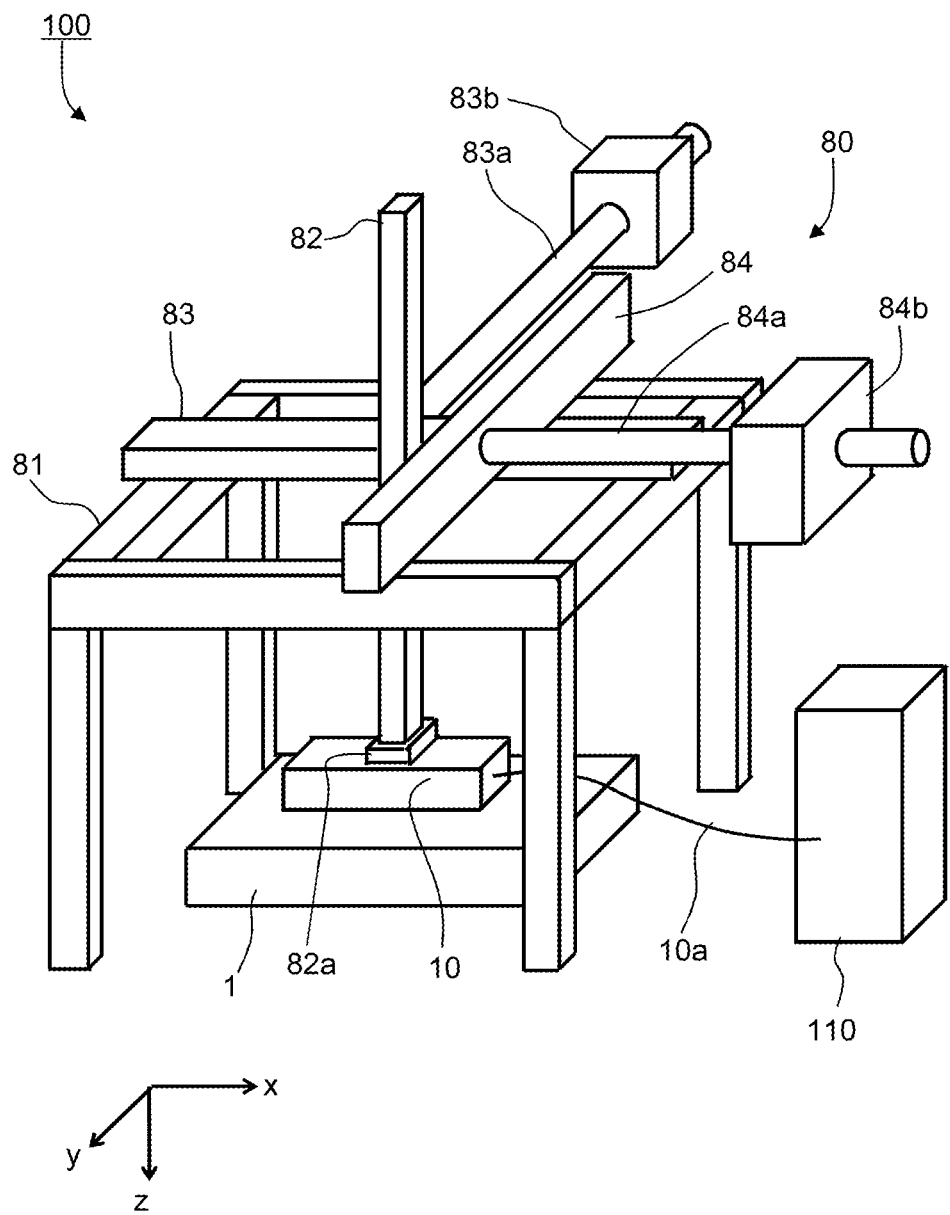
FIG. 2 is a perspective view showing the configuration of an array probe driving apparatus used in a linear-scan ultrasonic inspection apparatus according to the first embodiment.

FIG. 2 is a perspective view showing the configuration of an array probe driving apparatus used in a linear-scan ultrasonic inspection apparatus according to the first embodiment. In FIG. 2, the shape acquiring unit 90 is not illustrated.

The ultrasonic array probe 10 of the linear-scan ultrasonic inspection apparatus 100 is placed on the test object 1. The array probe driver 80 drives the ultrasonic array probe 10. The array probe driver 80 holds the linear-scan ultrasonic inspection apparatus 100 at a prescribed position for detecting a defect, if any, in the test object 1. For inspection of defects at several predetermined positions, the ultrasonic array probe 10 is moved along the predetermined positions. While the ultrasonic array probe 10 is moving, ultrasonic waves are neither received nor transmitted.

The array probe driver 80 has a driving shaft 82, a first supporter 83, a first support-driving shaft 83a, a first support-driver 83b, a second supporter 84, a second support-driving shaft 84a, a second support-driver 84b, and a frame 81 supporting these components.

Here, coordinate axes are set for explanation. That is, the lengthwise direction (i.e. the direction aligning the plurality of the ultrasonic elements 11 in the ultrasonic array probe 10) of the ultrasonic array probe 10 is an x direction (first direction), the depth direction from the ultrasonic array probe 10 toward the test object 1 is a z direction, and the direction perpendicular to the x and z directions is a y direction (second direction). The following description is based on the case that the test object 1 is arranged with one of its broad surfaces along the x-y plane.

The ultrasonic array probe 10 is coupled via a pad 82a to one end of the driving shaft 82 extending in the z direction. The pad 82a need not be used if the driving shaft 82 can be coupled directly to the ultrasonic array probe 10. The driving shaft 82 is supported, held in the x and y directions, at the part where the first supporter 83 extending in the x direction and the second supporter 84 extending in the y direction intersect with each other. The driving shaft 82 can move in the axial direction, i.e., z direction.

The first supporter 83 can be moved by the first support-driver 83b via the first support-driving shaft 83a shaped like a rod and extending in the y direction. The second supporter 84 can be moved by a second support-driver 84a via the second support-driving shaft 84a shaped like a rod and extending in the x direction. The first supporter 83 and the second supporter 84 can slide at the position where they intersect with each other. Alternatively, the first supporter 83 and the second supporter 84 may move parallel to each other, while the position where they intersect being held.

As shown in FIG. 1, the monitoring console 110 has a reception/transmission section 20, a calculator 30, a storage 40, a controller 50, a display 60, and the input 70.

The reception/transmission section 20 has a voltage applier 21, switches 22, and an AD converter 23. The voltage applier 21 applies a potential difference to the ultrasonic elements 11, thereby to energize the ultrasonic elements 11.

In accordance with a command coming from the controller 50, the switches 22 connects one or more ultrasonic elements 11 to the voltage applier 21 or disconnects one or more ultrasonic elements 11 from the voltage applier 21. That is, the switches 22 switch over each ultrasonic element 11 from a potential-difference applied state to a potential-difference not applied state, or vice versa. If one ultrasonic element 11 transmits an ultrasonic wave while every one of the ultrasonic elements 11 receive the wave reflected and attenuates the wave received, the wave can be distinguished from the ultrasonic wave transmitted by the next ultrasonic element 11. When the ultrasonic array probe 10 remains held at a specific position, switching over of each ultrasonic element 11 by the switches 22 can be automatically performed by an electronic circuit. If ultrasonic elements 11 transmit waves at about 0.1 second intervals, its transmission-reception time at the position of the ultrasonic array probe 10 is about 2 seconds in the case that N=20.

The AD converter 23 receives signals (i.e., echo signals) from the ultrasonic elements 11, converts the signals to digital data, and output the digital data as ultrasonic waveform data to the storage 40.

The voltage applier 21 has the function of applying the potential difference (i.e., voltage) of an arbitrary waveform to the ultrasonic elements 11 that have been turned on by the switches 22. The applied voltage has a waveform such as a sine waveform, a saw-tooth waveform, a rectangular waveform or a spike-pulse waveform. The voltage may be bipolar having both a positive value and a negative value, or unipolar having either a positive value or a negative value. Further, a positive offset or a negative offset may be added to the voltage. The waveform may be a single pulse, a burst or a continuous wave. The time interval of applying the voltage and the number of times the voltage is repeatedly applied may be increased or decreased.

The calculator 30 has a set-position calculator 31, a surface-shape calculator 32, a delay-time calculator 33, a synthesizing-calculator 34, an integrated-image generator 35, and an overlapping-region adjustor 36. The calculator 30 as well as the set-position calculator 31, the surface-shape calculator 32, the delay-time calculator 33, the synthesizing-calculator 34, the integrated-image generator 35, and/or the overlapping-region adjustor 36 may be configured as any of circuitries including but not limited to ICs, LSIs, processors or FPGA, or a computer comprising a processor, a memory, a storage and an interface, such as a personal computer (PC) that can perform various operations and data communication.

The set-position calculator 31 calculates the relative positions of the test object 1 and the ultrasonic array probe 10. The relative positions are the positions that the test object 1 and the ultrasonic array probe 10 are relative to each other. More specifically, they are defined by the distances between the test object 1 and the ultrasonic array probe 10, measured in the x, y and z directions (FIG. 2) wherein the x direction is the lengthwise direction of the array probe 10, or defined by the differences between the angles by which the test object 1 and the ultrasonic array probe 10 rotate around each of the x, y and z axes.

Set-position information data such as coordinate data or angle differences are stored in the processed-signal data storage 41 or set-position data storage 42 of the storage 40 (described later). The set-position calculator 31 reads the set-position information data from these storages, and calculates the relative position of the test object 1 and the ultrasonic array probe 10.

The surface-shape calculator 32 calculates the shape of the surface in the vicinity of the ultrasonic array probe 10, of the test object 1. The surface-shape calculator 32 must acquire data from outside in order to calculate the surface shape of the test object 1.

The data source from which the surface-shape calculator 32 acquires the data to calculate the surface shape of the test object 1 is basically similar to the data source from which the set-position calculator 31 requires. That is, the first data is the shape information data acquired by the shape acquiring unit 90 and stored in the set-position data storage 42 of the storage 40. The second data is the surface-wave data contained in the digital ultrasonic waveform data (namely, echo-waveform signal data) stored in the processed-signal data storage 41. The surface-shape calculator 32 uses the first data or the second data, or both, and calculates an acquired shape that is the surface shape of the test object 1.

Figure 3:
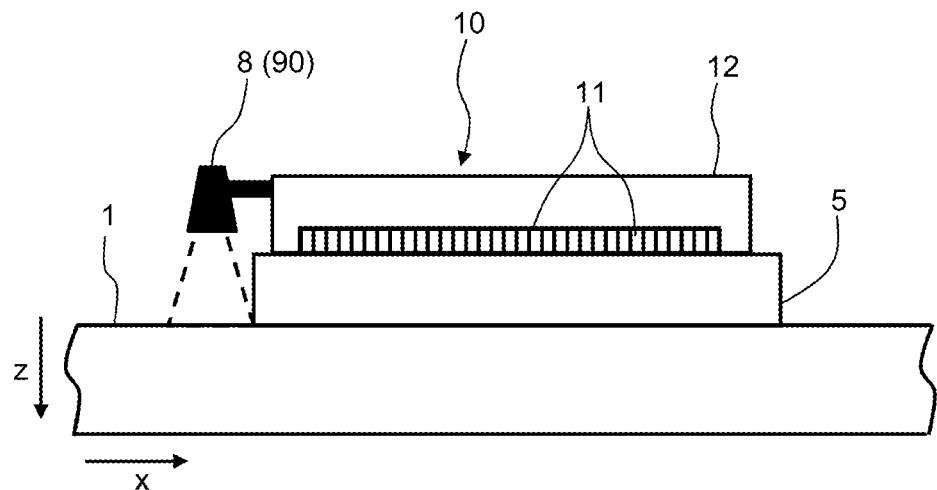
FIG. 3 is a sectional longitudinal view of an exemplary shape acquiring unit of the linear-scan ultrasonic inspection apparatus according to the first embodiment.

FIG. 3 is a sectional longitudinal view of an exemplary shape acquiring unit of the linear-scan ultrasonic inspection apparatus according to the first embodiment. The shape acquiring unit 90 is used to acquire the data representing the surface shape of the test object 1 and the data representing the positional relation between the test object 1 and the ultrasonic array probe 10.

Figure 4:
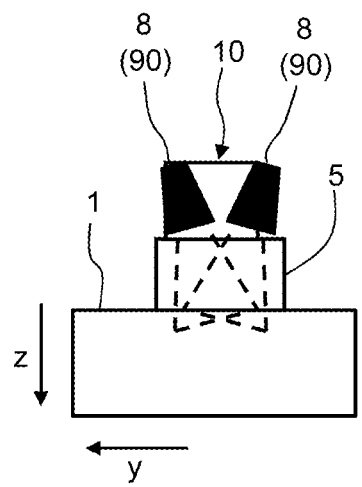
FIG. 4 is a side view of an exemplary shape acquiring unit of the linear-scan ultrasonic inspection apparatus according to the first embodiment.

FIG. 4 is a side view of an exemplary shape acquiring unit of the linear-scan ultrasonic inspection apparatus according to the first embodiment. FIG. 3 and FIG. 4 illustrate the case where the shape acquiring unit 90 has two cameras 8 attached to one end of the holding unit 12 of the ultrasonic array probe 10. The image signals output from the cameras 8 are received by the input 70 of the monitoring console 110, and are stored in the set-position data storage 42.

The number of cameras 8 used is not limited to two. Only one camera, or three or more cameras may be used. Further, the cameras 8 may be arranged at any other part of the holding unit 12, for example on the driving shaft 82 of the array probe driver 80 or any other part of the array probe driver 80. Using the stereoscopic image of the test object 1 obtained by the two cameras 8 make it possible to estimate the positional relations of the test object 1 and the ultrasonic array probe 10, based on image angles of feature quantities in a plurality of the images at each time. Furthermore, from the range of view angle it can be determined how much the test object 1 is spaced from the ultrasonic array probe 10.

The shape acquiring unit 90 may have a scanner able to be driven at prescribed pitch or may have an encoder. If the scanner or the encoder is used, it can be determined how much the ultrasonic array probe 10 has moved from the starting position as a reference position. The shape information data acquired by the shape acquiring unit 90 is read by the input 70 and then stored in the set-position data storage 42. Alternatively, the shape information data in drawings already prepared or the like may be read by the input 70 and then be stored in the set-position data storage 42. The shape information data includes data about the surface shape of the test object 1.

The set-position calculator 31 and the surface-shape calculator 32 read necessary shape information data from the set-position data storage 42, and then calculate the set position and the surface shape of the test object 1, and obtain the acquired shape.

Alternatively, the digital ultrasonic waveform data generated from the ultrasonic waves transmitted from the ultrasonic array probe 10 may be used and stored into the processed-signal data storage 41. If the test object 1 is a uniform flat plate having a gradually changing thickness as described later with reference to FIG. 6 to FIG. 8, echoes of the ultrasonic elements 11 will have different time to each other though they have no time difference if the test object 1 has even thickness. Therefore, the distance difference between the ultrasonic elements can be determined from the product of the sound speed in the acoustic propagation medium 5 and the delay time. Furthermore, it can be determined how much the ultrasonic array probe 10, disposed on the flat plate, is inclined.

Further, if the information about the surface echo, which is included in the digital ultrasonic waveform data, is utilized, the distribution of distance between the test object 1 and the ultrasonic array probe 10 can be calculated. The surface-shape calculator 32 can read out the ultrasonic waveform digital data from the processed-signal data storage 41 from the ultrasonic waveform data and calculate the acquired shape as the surface shape of the test object 1.

As described above, the set-position calculator 31 read out as necessary either of or both of the digital ultrasonic waveform data stored in the processed-signal data storage 41 or the shape information data stored in the set-position data storage 42. Then, the set-position calculator 31 calculates set positions, and the surface-shape calculator 32 calculates the surface-shape for obtaining the acquired shape.

The delay-time calculator 33 is so configured to calculate, referring to the surface shape of the test object 1, values of delay time of at least one of transmitting and receiving the ultrasonic wave with each of the ultrasonic elements 11. The delay-time calculator 33 calculates value of delay time during which each of the ultrasonic beams is transmitted, focused at a focal point, and received. In practice, to transmit the ultrasonic beams from the ultrasonic elements 11, with time difference, the switches 22 perform switching-over based on the calculated values of delay time, applying voltage to the ultrasonic elements 11. In the case of driving the ultrasonic elements 11 independently of one another, the synthesizing-calculator 34 (described later) synthesizes a digital ultrasonic wave, utilizing values of the delay time calculated by the delay-time calculator 33.

The delay-time calculator 33 calculates values of the delay time from the positional relation between the ultrasonic array probe 10 and the test object 1 (i.e., distance differences in coordinate axes and angle difference), the ultrasonic-inspection refraction angle $\beta$, the focus depth, the acquired shape of the test object 1, the sound speed in the acoustic propagation medium 5 and the test object 1.

The acquired shape of the test object 1 may have a curved surface or projections and recesses, not having a flat surface or an inclined flat surface as in most cases, and geometrical calculations can be performed. As described above, the surface of the test object 1 may be calculated by the surface-shape calculator 32 using the propagation time of the ultrasonic waves transmitted from the ultrasonic elements 11, or using the given shape information data such as drawings already prepared. Further, the shape acquiring unit 90 such as a camera or a laser range finder may be attached to the ultrasonic array probe 10 or positioned near the ultrasonic array probe 10. Still further, the delay time may be preset and stored in a memory, and may be read and then used.

The test object 1 may be tested, for example, region by region thereof. In this case, all ultrasonic elements 11 of the ultrasonic array probe 10 are not used at the same time, but some ultrasonic elements 11, as one group, are first used, and the ultrasonic elements 11 composing the group are sequentially shifted. The ultrasonic elements 11 of any group, which are simultaneously used, shall be called "active ultrasonic element group". The active ultrasonic element group may include all of the ultrasonic elements 11 of the ultrasonic array probe 10.

The delay-time calculator 33 similarly calculates a delay time for shifting each timing of receiving ultrasonic waves. The delay time is calculated based on the predetermined focal point and the relative position coordinates and inclination of each ultrasonic element 11 forming a group, so that the ultrasonic wave may be first focused at the predetermined focal point and then received. The focal point may be set on the back of the test object 1 or at a position sufficiently far from the back of the test object 1. Thus, the focal point may be set at an appropriate position in accordance with various conditions.

The synthesizing-calculator 34 generates a synthesized signal using the digital ultrasonic waveform data which the ultrasonic elements 11 of the active ultrasonic element group have received and which the processed-signal data storage 41 has stored. More specifically, the digital ultrasonic waveform data items received at a time with each delay time for the ultrasonic elements 11 are shifted along the time axis and then added or arithmetically averaged, thereby generating a synthesized signal (i.e., synthesized echo signal). The synthesized signal may be generated by methods other than addition and the arithmetic averaging.

The integrated-image generator 35 uses the waveforms obtained at two or more positions of the ultrasonic array probe 10, which overlap in the x direction each other, thereby generating the data for an x-z cross-sectional image, namely for a lengthwise-depth ultrasonic test image. Then, the lengthwise-depth ultrasonic test image is generated by the method set by an overlapping-region adjustor 36 as described later, thereby obtaining data of an integrated lengthwise-depth image. That is, the integrated-image generator 35 generates a lengthwise-depth integrated image data representing an image (i.e., lengthwise-depth position image) extending along the planes parallel to the x and z axes to be displayed for ultrasonic inspection.

Imaging is performed by either "B-scan" or "S-scan" in many cases. The image is reconstructed on the basis of the refraction angle or the ultrasonic inspection angle. Hereinafter, the imaging performed by B-scan will be described.

If two or more regions which the ultrasonic array probe 10 scans overlap each other in the area, the overlapping-region adjustor 36 selects a method of forming (generating) an image for the ultrasonic inspection, on the basis of the acquired shape of the test object 1, which has been acquired at each position of the ultrasonic array probe 10. That is, the overlapping-region adjustor 36 first refers to the acquired shape of the test object 1, which is obtained at each of the positions of the ultrasonic array probe 10, and then selects a method of forming an image of the overlapping region. Hence, the integrated-image generator 35 can generate a lengthwise-depth integrated image composed of two or more lengthwise-depth images obtained by ultrasonic inspection at each position.

The acquired shapes for the same region of the test object 1, which are obtained at the different position of the ultrasonic array probe 10, are not completely identical to each other. That is, the test object 1 may have a curved surface, or the longitudinal direction (i.e., x direction) in which the ultrasonic elements 11 are arranged may not be parallel to the surface of the test object 1. In such cases, the relation between the ultrasonic elements 11 and the incident angle is reversed to each other in performing the ultrasonic test in the same region. This makes the test result differ from each other. The propagation path and the values of the delay time of ultrasonic waves therefore differ from each other.

To calculate values of the delay time, information on setting of an active ultrasonic element group, information of coordinates and angles of each ultrasonic element 11 of the active ultrasonic element group, the surface shape data about the test object 1 at the position where the test object 1 receives ultrasonic waves must be acquired. The coordinates and the angles of each ultrasonic elements 11 are calculated by the set-position calculator 31, and the surface shape S of the test object 1 is calculated by the surface-shape calculator 32.

On the basis of the coordinates of each ultrasonic element 11, the shortest time that the ultrasonic waves need to propagate from the ultrasonic element 11 to the coordinates of the focal point on the test object 1 is calculated. The time difference between propagation time of each ultrasonic elements 11 and the shortest time is then determined as delay time. To calculate this delay time, the acquired shape obtained from the digital ultrasonic waveform data acquired, while the ultrasonic array probe 10 is set at the neighbor position, can be used.

The storage 40 has a processed-signal data storage 41 and a set-position data storage 42.

The processed-signal data storage 41 stores the digital ultrasonic waveform shape data which the AD converter 23 has generated from the ultrasonic echo signals received by the reception/transmission section 20.

The set-position data storage 42 receives the set-position information data about the relative position between the test object 1 and the ultrasonic array probe 10, and the shape information data about the shape including the acquired shape of the test object 1, from outside through the input 70. The set-position data storage 42 then stores the set-position information data and the shape information data, and output them to the set-position calculator 31.

The display 60 displays the data stored in the processed-signal data storage 41 and the set-position data storage 42, and the results of the calculation performed in the calculator 30. Further, the display 60 may display the synthesized signal of ultrasonic echoes, the result of visualization, the coordinates and the relative position of the ultrasonic array probe 10 to the test object 1, and ultrasonic inspection conditions such as delay time, focal depth and ultrasonic inspection refraction angle. Still further, the display 60 can display at least one of, or the combination of, the lengthwise-depth test image and the lengthwise-depth integrated image of the ultrasonic array probe 10 held at a set position and an acquired shape of the test object 1.

The display 60 can be any type that can display digital data, such as a so-called PC monitor, television or a projector. It may be a display which first converts an image into an analog signal and then displays an image, like a cathode-ray tube. Alternatively, it may have a user interface function of generating an alarm by either sound or light, or have a user interface such as a touch panel.

The input 70 receives both of the set-position information data and the shape information data described above from outside, and receives data needed for calculation such as physical property data and acoustic characteristic data from outside.

The controller 50 controls the reception/transmission section 20, the calculator 30, the storage 40, the display 60, and the input 70, thereby adjusting the operating timing of these sections (i.e. the reception/transmission section 20, the calculator 30, the storage 40, the display 60, and the input 70) for matching. The controller 50 may be a versatile apparatus, such as a personal computer (PC) that can perform various operations and data communication. If this is the case, the PC can be connected to those sections that the monitoring console 110 has, via the communication cables has those sections, except the ultrasonic array probe 10, the array probe driver 80 and the shape acquiring unit 90.

Figure 5:
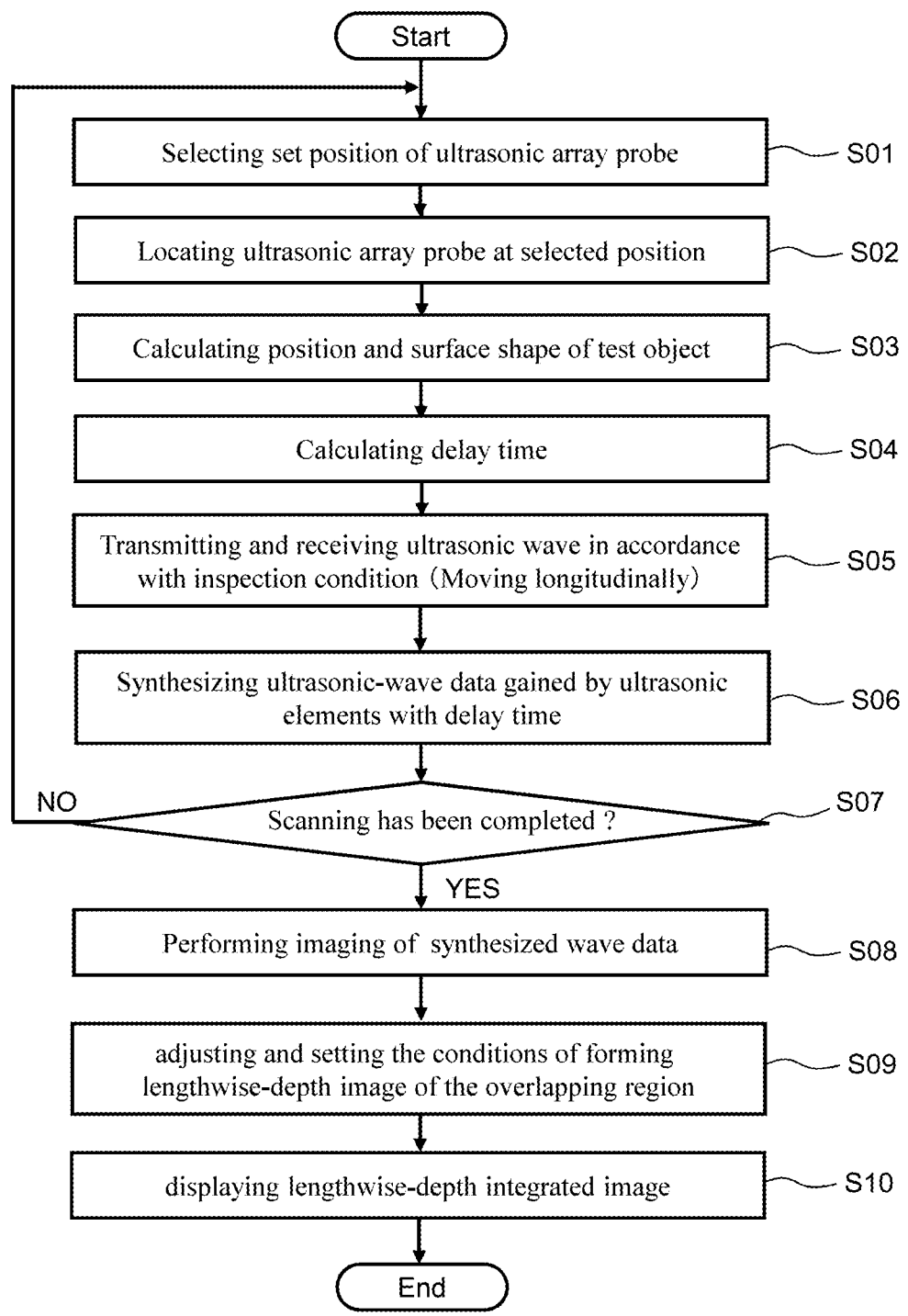
FIG. 5 is a flowchart showing a sequence of the linear-scan ultrasonic test according to the first embodiment.

FIG. 5 is a flowchart showing a sequence of the linear-scan ultrasonic test according to the first embodiment. The linear-scan ultrasonic test according to the first embodiment will be described step by step.

To inspect the test object 1, the ultrasonic array probe 10 is set. The ultrasonic array probe 10 transmits ultrasonic waves to the test object 1, and receives the ultrasonic waves reflected by the test object 1. If the test object 1 is larger than the ultrasonic array probe 10, the ultrasonic array probe 10 must be shifted in the x direction, sequentially to several positions. The set position of the ultrasonic array probe 10 is selected at first (Step S01). Then, the ultrasonic array probe 10 is located at the selected position (Step S02).

Next, the position and the surface shape of the test object 1 are calculated (Step S03). That is, the set-position calculator 31 calculates the relative positions of the test object 1 and the ultrasonic array probe 10. Further, the surface-shape calculator 32 calculates the shape of that surface of the test object 1, which faces the ultrasonic array probe 10, and obtains an acquired shape. Step S03 will be more specifically explained, referring to the case where the ultrasonic array probe 10 transmits ultrasonic waves to the test object 1.

Figure 6:
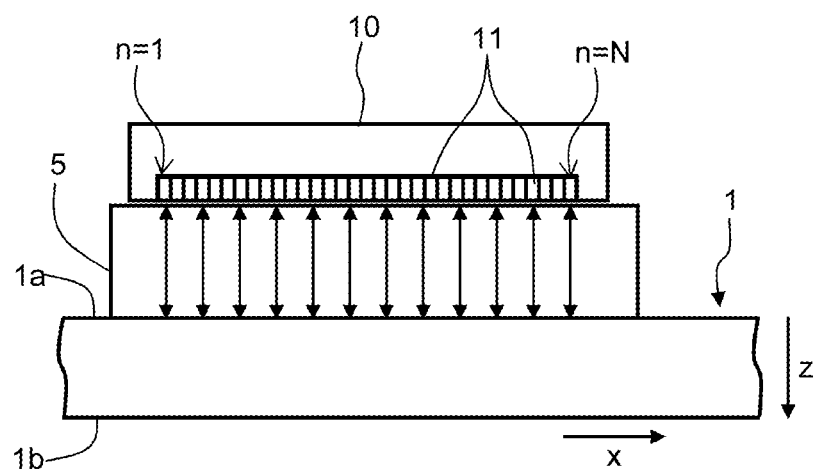
FIG. 6 is a sectional longitudinal view illustrating a first combination of a test object having a shape of a flat plate and the ultrasonic array probe of the linear-scan ultrasonic inspection apparatus according to the first embodiment.

FIG. 6 is a sectional longitudinal view illustrating a first combination of a test object having a shape of a flat plate and the ultrasonic array probe of the linear-scan ultrasonic inspection apparatus according to the first embodiment.

Figure 7:
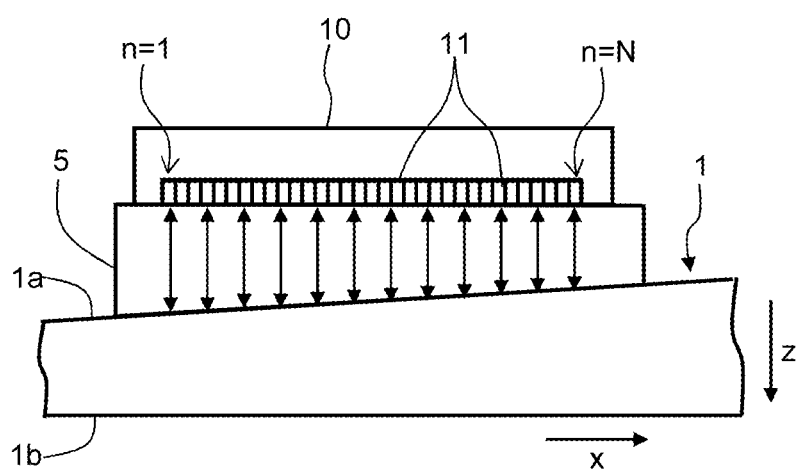
FIG. 7 is a sectional longitudinal view illustrating a second combination of a test object having a shape of a flat plate and the ultrasonic array probe of the linear-scan ultrasonic inspection apparatus according to the first embodiment.

FIG. 7 is a sectional longitudinal view illustrating a second combination of a test object having a shape of a flat plate and the ultrasonic array probe of the linear-scan ultrasonic inspection apparatus according to the first embodiment. In the case shown in FIG. 7, the test object 1 has its thickness changing in the lengthwise direction (i.e., x direction).

Figure 8:
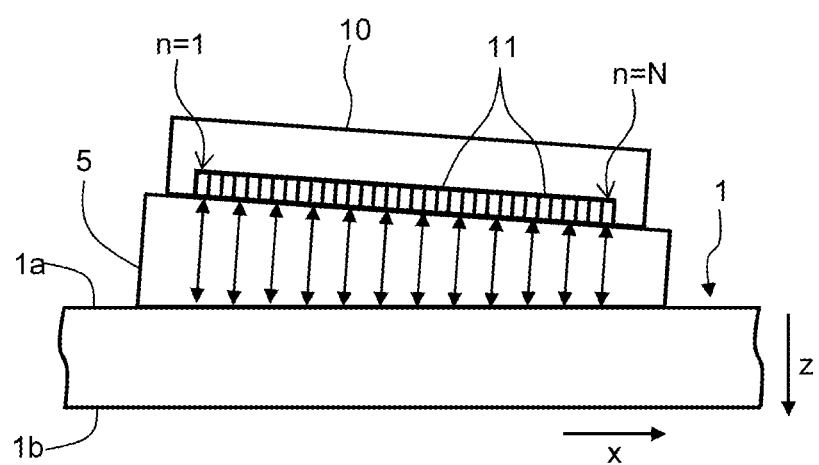
FIG. 8 is a sectional longitudinal view illustrating a third combination of a test object having a shape of flat plate and the ultrasonic array probe of the linear-scan ultrasonic inspection apparatus according to the first embodiment.

FIG. 8 is a sectional longitudinal view illustrating a third combination of a test object having a shape of flat plate and the ultrasonic array probe of the linear-scan ultrasonic inspection apparatus according to the first embodiment. In the case shown in FIG. 8, the ultrasonic array probe 10 is inclined to the x axis (i.e., x direction).

First, the ultrasonic array probe 10 is positioned, facing the surface of the test object 1 across the sound propagation medium 5. Next, a potential difference is applied to the N ultrasonic elements 11, one after another. The N ultrasonic elements 11 receive reflected waves. The time that elapses from the moment when the n-th ultrasonic element 11 (n=1, 2, ..., N) transmits ultrasonic waves to the moment when the n-th ultrasonic element 11 receives the waves reflected at the surface of the test object 1 is hereinafter referred to as "surface time interval $t_{1n}$". The time that elapses from the moment the n-th ultrasonic element 11 (n=1, 2, . . . , N) transmits ultrasonic waves to the moment the n-th ultrasonic element 11 receives the waves reflected at the back of the test object 1 (i.e., surface facing away from the surface to which the ultrasonic waves have been transmitted) is hereinafter referred to as "back time interval $t_{2n}$."

Then, if each of the surface time intervals $t_{1n}$ and the back time intervals $t_{2n}$ may fall within the measurement precision ranges for all n (n=1, 2, . . . , N), the distance between the ultrasonic array probe 10 and the front 1a and the distance between the front 1a and the back 1b of the test object 1 is constant in the x and y directions.

If the surface time intervals $t_{1n}$ may gradually decrease and the back time intervals $t_{2n}$ may not change so much as n approaches from 1 to N, the distance between the ultrasonic array probe 10 and the front 1a of the test object 1 decreases but the distance between the ultrasonic array probe 10 and the back 1b of the test object 1 does not change. This case corresponds to the case where the thickness of the test object 1 increases as n approaches from 1 to N and the ultrasonic array probe 10 is arranged parallel to the back 1b of the test object 1 as shown in FIG. 7.

For example, if the surface time intervals $t_{1n}$ gradually decreases and the back time intervals $t_{2n}$ decreases at the same rate as n approaches from 1 to N, the distance between the front 1a and the back 1b of the test object 1 decreases as n approaches from 1 to N, and the thickness of the test object 1 does not change. This is equivalent to the case where the ultrasonic array probe 10 is inclined to the test object 1 having a constant thickness as shown in FIG. 8.

The ultrasonic elements 11 of the ultrasonic array probe 10 are arranged in the lengthwise direction (in the arrangement direction of n=1 to N) of the ultrasonic array probe 10 and are aligned in a straight line, not protruding or receding from one another. Therefore, the protrusions and the recesses that the test object 1 has on the surfaces of the front 1a and the back 1b (i.e., surface shapes of the test object 1) can be detected in the lengthwise direction of the ultrasonic array probe 10. Similarly, the relative positional relation between the ultrasonic array probe 10 and the test object 1 can be determined.

The set-position calculator 31 and the surface-shape calculator 32 calculate the surface time intervals $t_{1n}$ and the back time intervals $t_{2n}$ on the basis of the data stored in the processed-signal data storage 41 that stores the digital ultrasonic-waveform data output from the AD converter 23 of the reception/transmission section 20.

The case as shown in FIGS. 7 and 8 that an ultrasonic wave transmitted from the first ultrasonic element 11 (n=1) is transmitted perpendicular (namely, in z direction) to the front 1a of the test object 1 and is reflected from the front 1a is considered. Then, the ultrasonic wave so reflected propagates toward a point outside with respect to the lengthwise direction (i.e., to the left in FIGS. 7 and 8) since the normal to the front 1a concerning the reflection inclines outside with respect to the lengthwise direction (i.e., to the left in FIG. 7).

In this case, the ultrasonic wave transmitted from the first ultrasonic element 11 (n=1) is weaker than the ultrasonic wave transmitted from any other ultrasonic element 11 (n is not 1). Then, the ultrasonic wave transmitted from the first ultrasonic element 11 (n=1) in this case may be not be reliable as data for use in the set-position calculator 31 and the surface-shape calculator 32. If the test object 1 has larger protrusions or recesses in the surface, the ultrasonic waves transmitted from, for example, the second ultrasonic element 11 (n=2) may not be reliable, either.

It is therefore important how to examine those parts of the test object 1, which oppose the ends of the ultrasonic array probe 10, in order to determine whether the test object 1 has protrusions and recesses in its front 1a and its back 1b, that is, the lengthwise surface shape of the test object 1. In view of this, when the ultrasonic array probe 10 is shifted, next position in the lengthwise direction of the ultrasonic array probe 10 is determined so as to provide an overlapping region. Therefore, a plurality of data of acquired shapes is acquired for the overlapping region.

Figure 9:
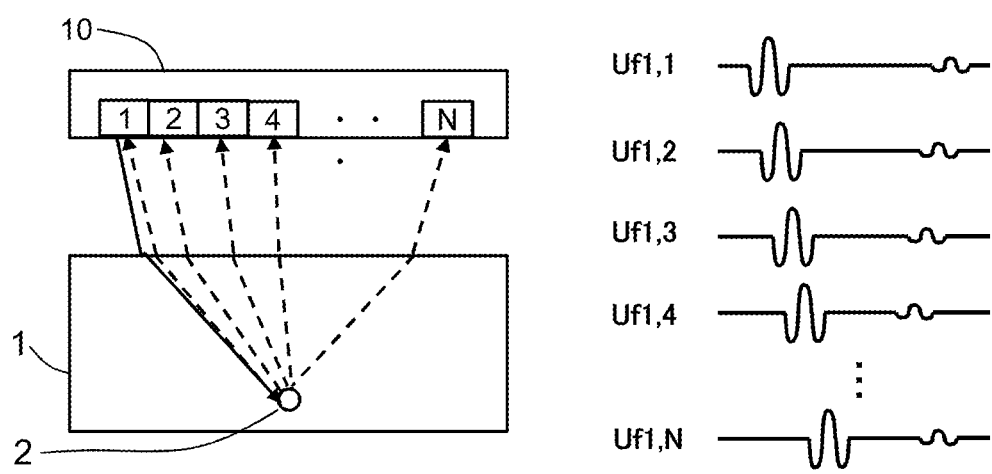
FIG. 9 shows how the ultrasonic waves transmitted and received by the linear-scan ultrasonic inspection method according to the first embodiment. Left side in the FIG. 9 shows a block diagram and right side shows received signals by each ultrasonic elements when the ultrasonic is sent by a first ultrasonic element.
Figure 10:
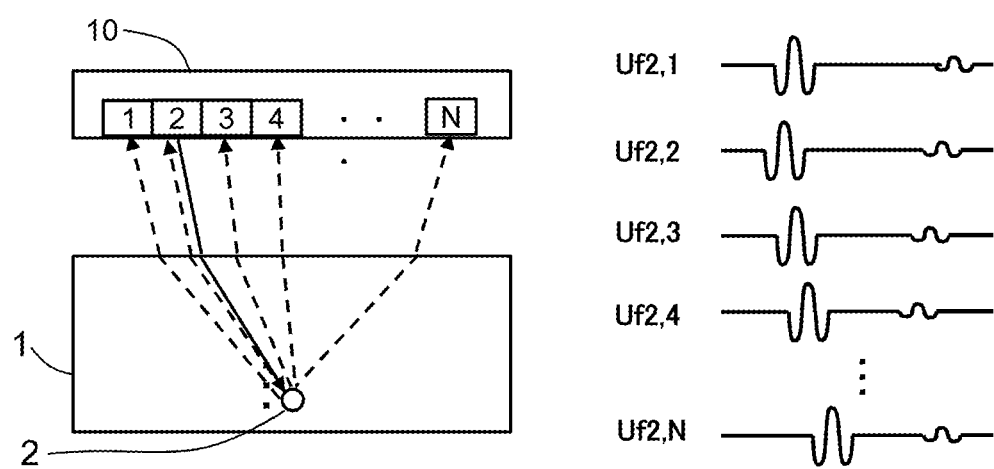
FIG. 10 shows how the ultrasonic waves transmitted and received by the linear-scan ultrasonic inspection method according to the first embodiment. Left side in the FIG. 10 shows a block diagram and right side shows received signals by each ultrasonic elements when the ultrasonic is sent by a second ultrasonic element.
Figure 11:
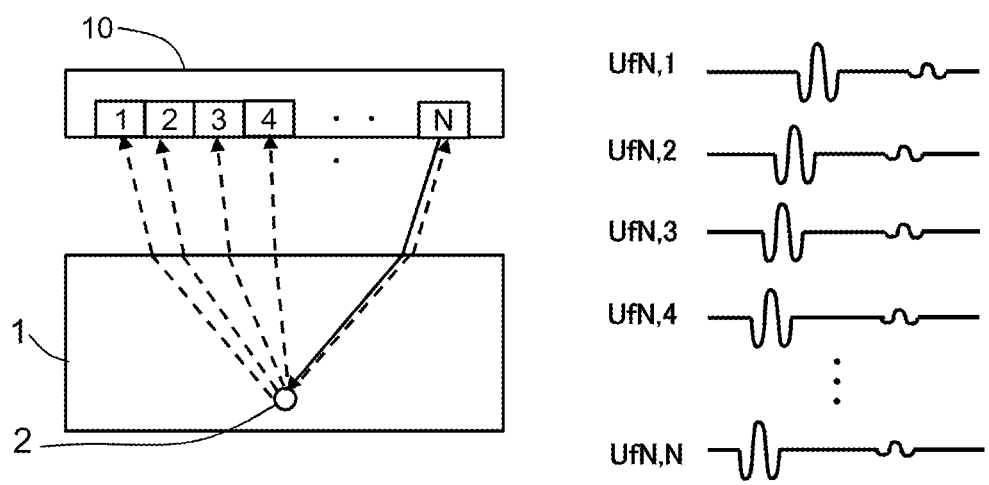
FIG. 11 shows how the ultrasonic waves transmitted and received by the linear-scan ultrasonic inspection method according to the first embodiment. Left side in the FIG. 11 shows block diagram and right side shows received signals by each ultrasonic element when the ultrasonic is sent by an N-th ultrasonic element.

FIG. 9 shows how the ultrasonic waves transmitted and received by the linear-scan ultrasonic inspection method according to the first embodiment. Left side in the FIG. 9 shows a block diagram and right side shows received signals by each ultrasonic elements when the ultrasonic wave is sent by a first ultrasonic element. FIG. 10 shows how the ultrasonic waves transmitted and received by the linear-scan ultrasonic inspection method according to the first embodiment. Left side in the FIG. 10 shows a block diagram and right side shows received signals by each ultrasonic elements when the ultrasonic wave is sent by a second ultrasonic element. FIG. 11 shows how the ultrasonic waves transmitted and received by the linear-scan ultrasonic inspection method according to the first embodiment. Left side in the FIG. 11 shows block diagram and right side shows received signals by each ultrasonic element when the ultrasonic wave is sent by an N-th ultrasonic element.

One or more ultrasonic elements 11 of the ultrasonic array probe 10 transmit ultrasonic waves and one or more ultrasonic elements 11 of the ultrasonic array probe 10 receive the ultrasonic waves reflected from the defect 2. This sequence is repeated, shifting the ultrasonic elements 11 that transmit the ultrasonic waves, thus acquiring response waveform data. All N ultrasonic elements 11 or some of the ultrasonic elements 11 may be used for transmitting or receiving as shown in FIG. 9.

In the case shown in FIG. 9, the switches 22 incorporated in the reception/transmission section 20 make N ultrasonic elements 11 transmit ultrasonic waves in a sequential order from the first ultrasonic elements 11 to the N-th ultrasonic elements 11.

If the first ultrasonic element 11 (n=1) transmits an ultrasonic wave as shown in FIG. 9, all ultrasonic elements 11 (n=1 to N) receive the signals, respectively, which have the waveforms illustrated in the right part of FIG. 9. If the second ultrasonic element 11 (n=2) transmits an ultrasonic wave as shown in FIG. 10, all ultrasonic elements 11 (n=1 to N) receive the signals, respectively, which have the waveforms illustrated in the right part of FIG. 10. If the last ultrasonic element 11 (n=N) transmits an ultrasonic wave as shown in FIG. 11, ultrasonic elements 11 (n=1 to N) receive the signals, respectively, which have the waveforms illustrated in the right part of FIG. 11.

At most N×N fundamental waveforms can be recorded by using the ultrasonic array probe 10 including N ultrasonic elements 11, when the N ultrasonic elements 11 are driven one by one sequentially. Only for transmitting, a plurality of ultrasonic elements 11 instead of a single ultrasonic element 11 can be used, while each of ultrasonic elements 11 receives the waveform. In this case, values of the delay time can be applied, thereby to form the plane waves, to make the ultrasonic waves converge or diffuse.

The ultrasonic waves transmitted into the test object 1 are reflected and scattered by the defect 2 such as crack or debris existing on the surface of the test object 1 or in the test object 1. The ultrasonic waves so reflected or scattered is received by the ultrasonic elements 11 of the ultrasonic array probe 10.

The ultrasonic wave transmitted from each ultrasonic element 11 is received by each of the N ultrasonic elements 11 including the ultrasonic element that has transmitted the ultrasonic wave, and is then successively processed. The processed signal data is stored in the processed-signal data storage 41 of the storage 40.

Figure 12:
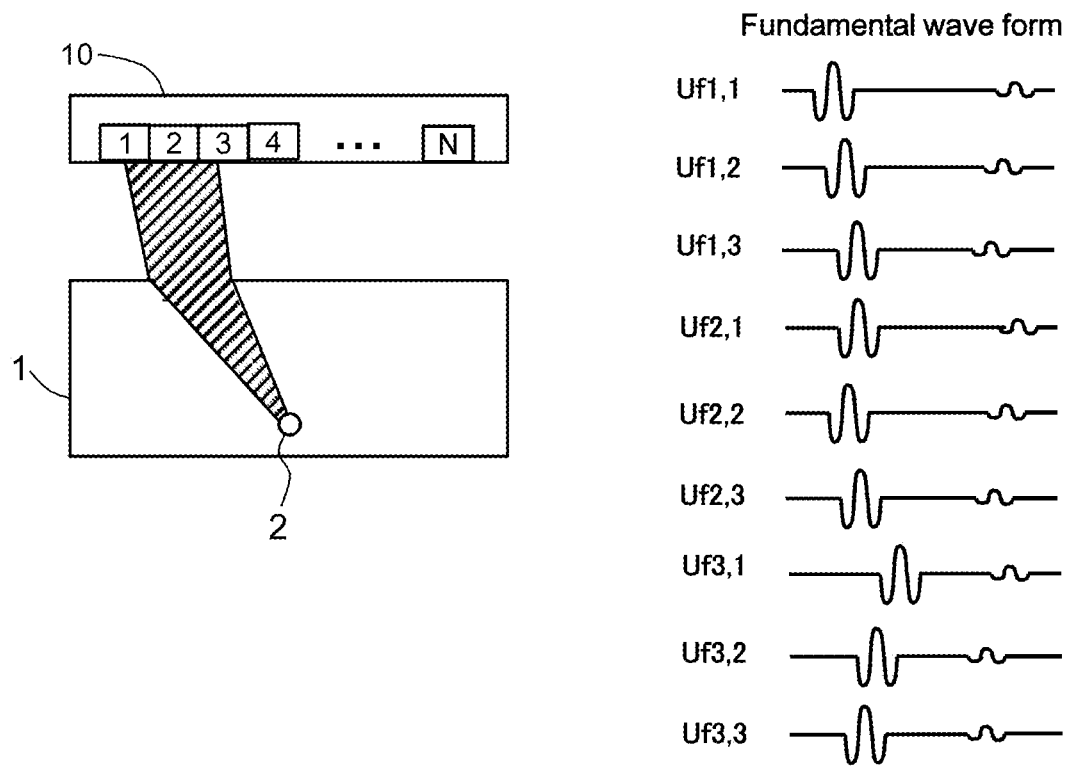
FIG. 12 shows how ultrasonic wave is sent and received by the ultrasonic array probe by the linear-scan ultrasonic inspection method according to the first embodiment. Left side in the FIG. 12 shows block diagram and right side is a waveform diagram of a part of an echo wave.

FIG. 12 shows how ultrasonic wave is sent and received by the ultrasonic array probe by the linear-scan ultrasonic inspection method according to the first embodiment. Left side in the FIG. 12 shows block diagram and right side is a waveform diagram of a part of an echo wave. For sake of simple explanation, only three ultrasonic elements are used as seen from FIG. 12, and the first to the third ultrasonic elements transmit ultrasonic waves toward a defect 2 existing in the test object 1. Three ultrasonic waves are transmitted from first to third elements, respectively, with a time delay with respect to one another, so that they may converge at a particular point existing in a particular direction. Alternatively, each of the ultrasonic waves may be transmitted individually, processed by the AD converter 23, and then stored in the processed-signal data storage 41. Then, the processed signal data stored in the processed-signal data storage 41 are synthesized with a time delay with respect to one another.

Hereinafter, it will be described under the case where three ultrasonic elements 11 transmit ultrasonic waves with a time delay with respect to one another. Alternatively, the ultrasonic waves may be transmitted individually and then synthesized with a time delay. In either case, the directions and the converging point (i.e., focal point) where they converge are determined by using the time delay of transmitting the ultrasonic waves from the three ultrasonic elements 11. The number of ultrasonic elements 11 of transmitting group is not limited to three. Two ultrasonic elements or four or more ultrasonic elements may be used as the same transmitting group.

In this case, the focal point may be appropriately set in accordance with the various conditions, at a position such as that in the back 1b of the test object 1 as viewed from the ultrasonic array probe 10 or that far enough from the back 1b of the test object 1.

The waveform without considering time-delay will be referred to as "fundamental waveform." Hereinafter, the serial number of any ultrasonic element 11 that transmits an ultrasonic wave will be prefixed with "p", and the serial number of any ultrasonic element 11 that receives an ultrasonic wave will be prefixed with "q", and the fundamental waveform will be referred to as "Ufp,q".

As shown in FIG. 12, the ultrasonic waves transmitted from the first ultrasonic element and received by the first to third ultrasonic elements are labeled "Uf1,1", "Uf1,2" and "Uf1,3", respectively. The ultrasonic waves transmitted from the second ultrasonic element and received by the first to third ultrasonic elements are labeled "Uf2,1", "Uf2,2" and "Uf2,3", respectively. Similarly, the ultrasonic waves transmitted from the third ultrasonic element and received by the first to third ultrasonic elements are labeled "Uf3,1", "Uf3,2" and "Uf3,3", respectively.

Figure 13:
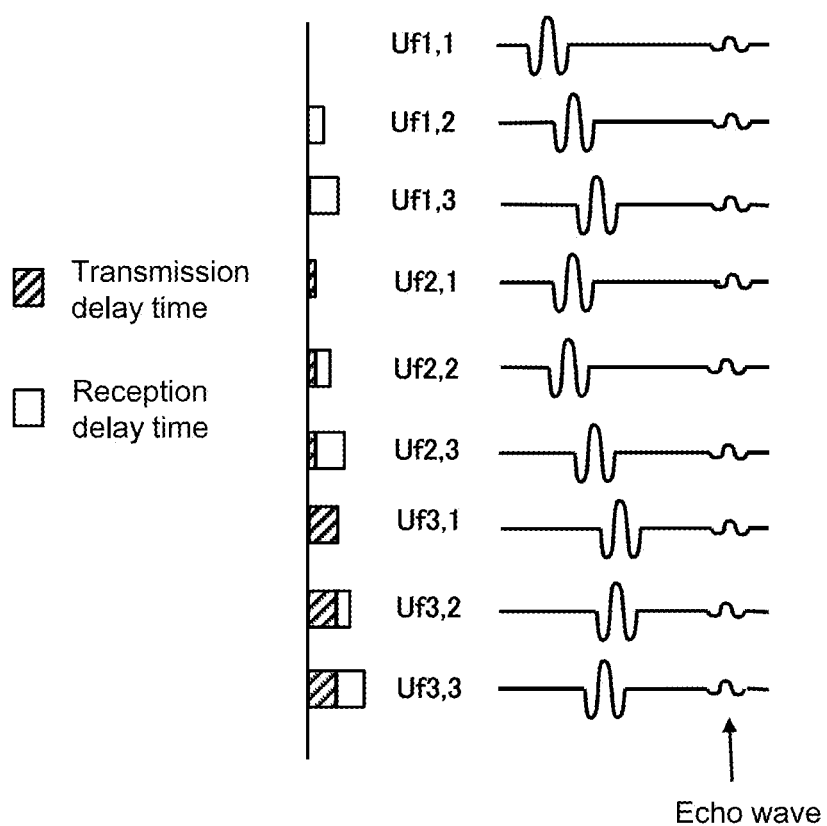
FIG. 13 is a waveform diagram explaining the delay time when ultrasonic wave is sent and received by the linear-scan ultrasonic inspection method according to the first embodiment.

FIG. 13 is a waveform diagram explaining the delay time when ultrasonic wave is sent and received by the linear-scan ultrasonic inspection method according to the first embodiment. The delay time illustrated in FIG. 13 is the sum of a transmission delay time required to converge the ultrasonic wave transmitted and a reception delay time required to converge the ultrasonic waves received. The ultrasonic element 11 that transmits the ultrasonic wave need not necessarily be same as the ultrasonic element 11 that receives the ultrasonic wave.

After Step S03, the delay-time calculator 33 calculates delay time T (Step S04). The delay time T is the value gained by subtracting the reference time from the sum of the transmission delay time and the reception delay time, based on the relative positions (each defined by coordinates and an angle) of the test object 1 and the focal point, which have been calculated by the set-position calculator 31, on each combination of the transmitting and receiving ultrasonic elements 11 of the ultrasonic array probe 10.

After Step S04, ultrasonic waves are transmitted and received in accordance with the conditions for the ultrasonic inspection (Step S05). More specifically, ultrasonic waves are transmitted with each delay time calculated by the delay-time calculator 33 in Step S04. For example, the first to third ultrasonic elements 11 transmit ultrasonic waves with each prescribed delay time. Then, the second to fourth ultrasonic elements 11 transmit ultrasonic waves with each prescribed time delay. Thus, the group of the ultrasonic elements 11 arranged in the lengthwise direction of the ultrasonic array probe 10 that transmit longitudinally shifts group by group. Finally, the (N−2)-th element to the N-th element transmit ultrasonic waves, with each time delay.

Next, the synthesizing-calculator 34 synthesizes the digital ultrasonic-waveform data thus obtained (Step S06). More precisely, the delay-time calculator 33 shifts, as shown in FIG. 13, respective fundamental waveforms in the time axis direction, using each delay time T that the delay-time calculator 33 has calculated or the relative delay time that is the difference between the delay time T and the reference delay time. Then, the waveforms are synthesized, generating a synthesized waveform M. As a result, reflected waves are generated at the same time point.

Figure 14:
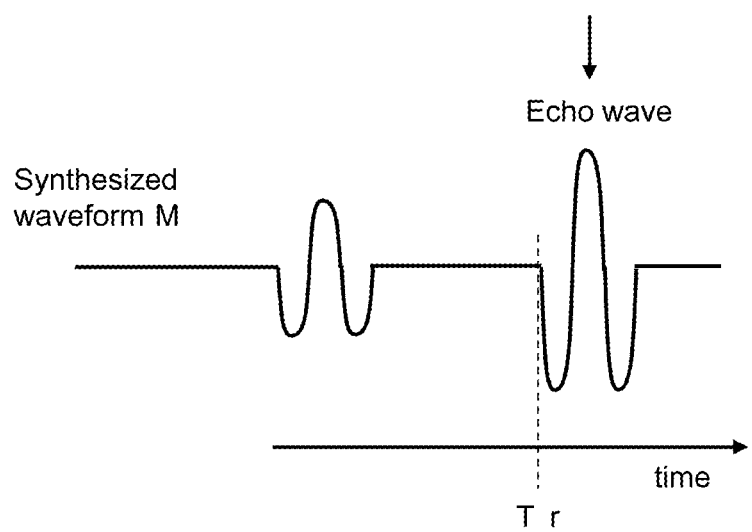
FIG. 14 is a waveform diagram showing the echo waveform synthesized in the linear-scan ultrasonic inspection method according to the first embodiment.

FIG. 14 is a waveform diagram showing the echo waveform synthesized in the linear-scan ultrasonic inspection method according to the first embodiment. The echo waveform may be synthesized by addition or averaging. The method of synthesizing the echo waveform is not limited to these, nevertheless. Any other synthesizing method may be used.

The method of obtaining the synthesized waveform M is not limited to the method described above. As in the general phased-array UT, the means may be used, which selects element groups to drive, sets the transmitting/receiving time delay, to transmit the time delay in the circuit at the time of transmitting and receiving ultrasonic waves and energize the element groups selected, thereby generating the synthesized waveform M.

When the digital ultrasonic-waveform data thus generated is synthesized, acquiring synthesized waveform data, the S/N ratio of each reflected wave increases. The time Tr at which the reflected waves have been generated can be obtained with high precision, and the position of the defect can be precisely determined.

Next, the controller 50 determines whether the ultrasonic array probe 10 has finished the scanning at all predetermined positions, namely whether the scanning has been completed (Step S07). If the scanning has not been completed ("NO" in Step S07), the process returns to Step S01, and a new position to which the ultrasonic array probe 10 must move in its lengthwise direction is set. Step S02 and following steps are then performed. At this time, an overlapping region exists between the region where the ultrasonic array probe 10 covers the test object 1 set at the new position and the region where the ultrasonic array probe 10 covered the test object 1 before moving to the new position.

If the scanning has been completed ("YES" in Step S07), imaging of the synthesized waveform data is performed (Step S08). That is, from the synthesized waveform data generated by the synthesizing-calculator 34, the integrated-image generator 35 generates lengthwise-depth image data which the display 60 will use to display an integrated image. The display 60 displays the integrated image based on the lengthwise-depth image data.

Figure 15:
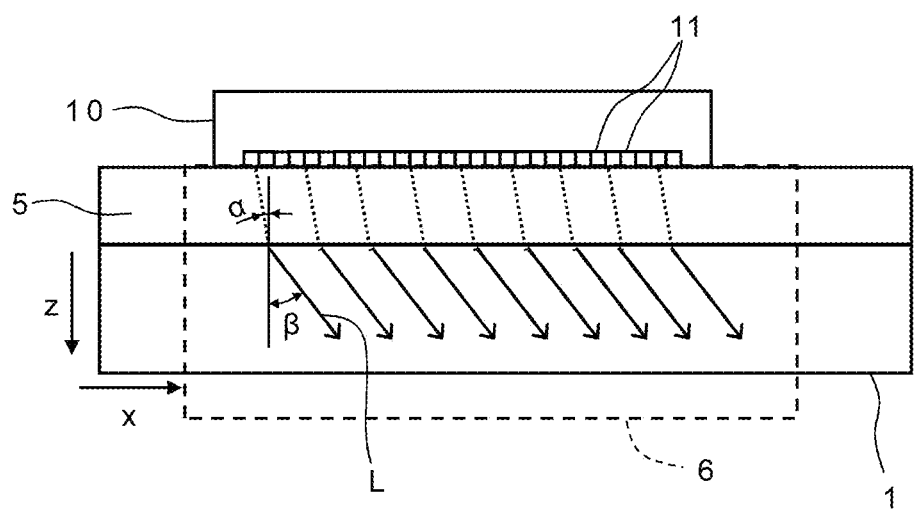
FIG. 15 is a conceptual, sectional longitudinal view for explaining the direction in which ultrasonic waves propagate by the linear-scan ultrasonic inspection apparatus according to the first embodiment.

FIG. 15 is a conceptual, sectional longitudinal view for explaining the direction in which ultrasonic waves propagate by the linear-scan ultrasonic inspection apparatus according to the first embodiment. Ultrasonic inspection region 6 is longer in the x direction than the region covered by the ultrasonic elements 11 of the ultrasonic array probe 10.

In order to obtain a lengthwise-depth image by means of linear scanning, not only the synthesized waveform M, but also an information on the ultrasonic-beam path L through which the synthesized wave has propagated is utilized. If a plurality of ultrasonic elements 11 has been used to generate the synthesized waveform, the path extending from, for example, the center ultrasonic element 11 will be used as synthesized-waveform propagation path.

The ultrasonic-beam path L is defined by the incident angle α of the synthesized waveform M and the inspection refraction angle β.

Figure 16:
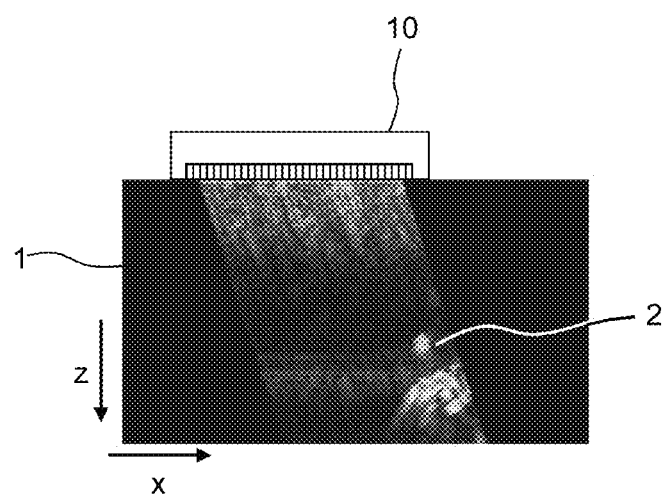
FIG. 16 is a lengthwise-depth ultrasonic test image, which is an exemplary result of the ultrasonic inspection that has been performed by the linear-scan ultrasonic inspection apparatus according to the first embodiment.

FIG. 16 is a lengthwise-depth ultrasonic test image, which is an exemplary result of the ultrasonic inspection that has been performed by the linear-scan ultrasonic inspection apparatus according to the first embodiment. The lengthwise-depth ultrasonic test image is based on the lengthwise-depth integrated image data generated by the integrated-image generator 35, and is displayed by the display 60 as shown in FIG. 16. If the ultrasonic array probe 10 performs, at its two set positions, the ultrasonic inspection, the integrated-image generator 35 generates two lengthwise-depth ultrasonic test images for the respective two set positions.

Next, the overlapping-region adjustor 36 adjusts and sets the conditions of forming (generating) a lengthwise-depth image of the overlapping region (Step S09).

Figure 17:
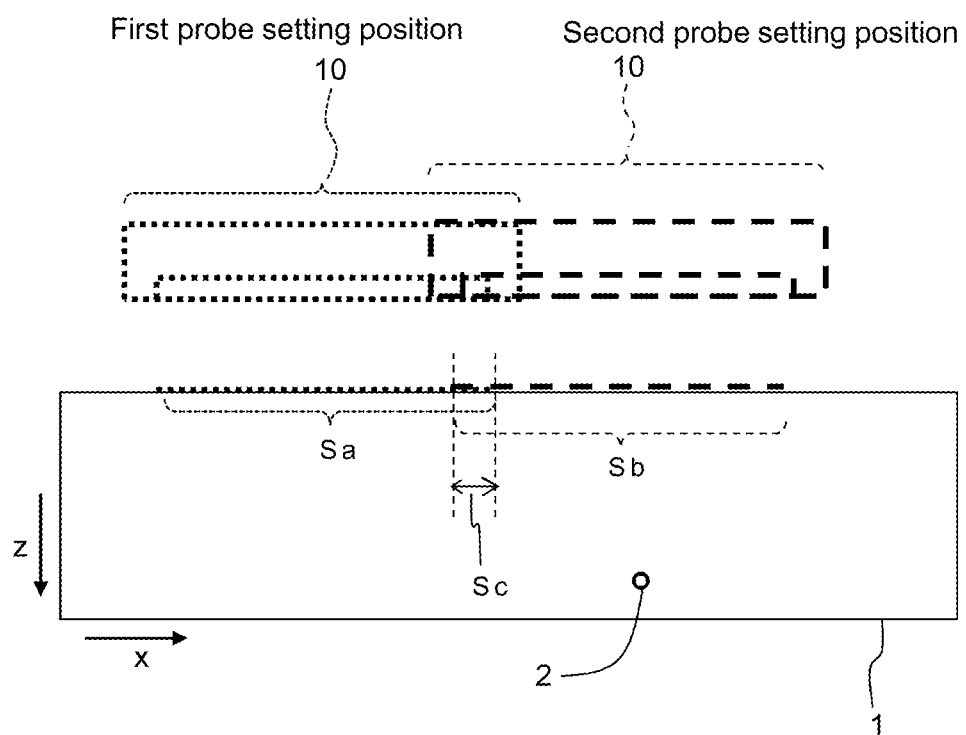
FIG. 17 is a conceptual, sectional longitudinal view explaining how images are integrated when surface shape information data about the test object are acquired at two set positions of the ultrasonic array probe.

FIG. 17 is a conceptual, sectional longitudinal view explaining how images are integrated when surface shape information data about the test object are acquired at two set positions of the ultrasonic array probe. Here it is assumed that positions of the ultrasonic array probe 10, or a first-probe setting position and a second-probe setting position that is another region in the x direction, are as follows. That is, parts covered by the ultrasonic array probe 10 at the first-probe setting position and parts covered at the second-probe setting position have overlapped region, each other. The second-probe setting position is shifted in the x direction from the first-probe setting position.

The delay time is the sum of the transmission delay time and the reception delay time. The transmission delay time is the time each ultrasonic wave needs to travel from the ultrasonic element 11 to the test object 1 and then to the defect 2 in the test object 1. The reception delay time is the time each ultrasonic wave reflected by the defect 2 needs to travel in the test object 1, emerges from the test object 1 and reaches the ultrasonic element 11.

The transmission delay time and the reception delay time depend on the surface shape of the test object 1. That is, the distance to the test object 1 changes if the surface shape changes, or the propagation path changes if the angle of the normal changes.

In order to calculate the values of the delay time, the delay-time calculator 33 utilizes the coordinates and angles of each of the ultrasonic elements 11 that are driven as a group, and the acquired shape S of the test object 1 to which ultrasonic waves are transmitted. The surface shape S of the test object 1 has been calculated by the surface-shape calculator 32. Based on the coordinates of each ultrasonic element 11, the shortest time the ultrasonic wave needs to propagate from each ultrasonic element 11 to the focal point set in the test object 1 is calculated, and the time difference between the ultrasonic elements 11 is used as a delay time.

As a result, the first acquired shape Sa about the test object 1, which the surface-shape calculator 32 has calculated from the synthesized waveform data acquired at the first-probe setting position, overlaps the second acquired shape Sb about the test object 1, which the surface-shape calculator 32 has calculated from the synthesized waveform data acquired at the second-probe setting position. Consequently, surface shape Sc for the mutually overlapping regions of the first acquired shape Sa and the second acquired shape Sb must be set, and the overlapping-region adjustor 36 determines the surface shape Sc.

Thus, when the ultrasonic array probe 10 is to be sequentially shifted to take several positions along the lengthwise direction (x direction), partly overlapping each other, the delay-time calculator 33 calculates values of the delay time based on the surface shape of the overlapping region determined in step S04.

Figure 18:
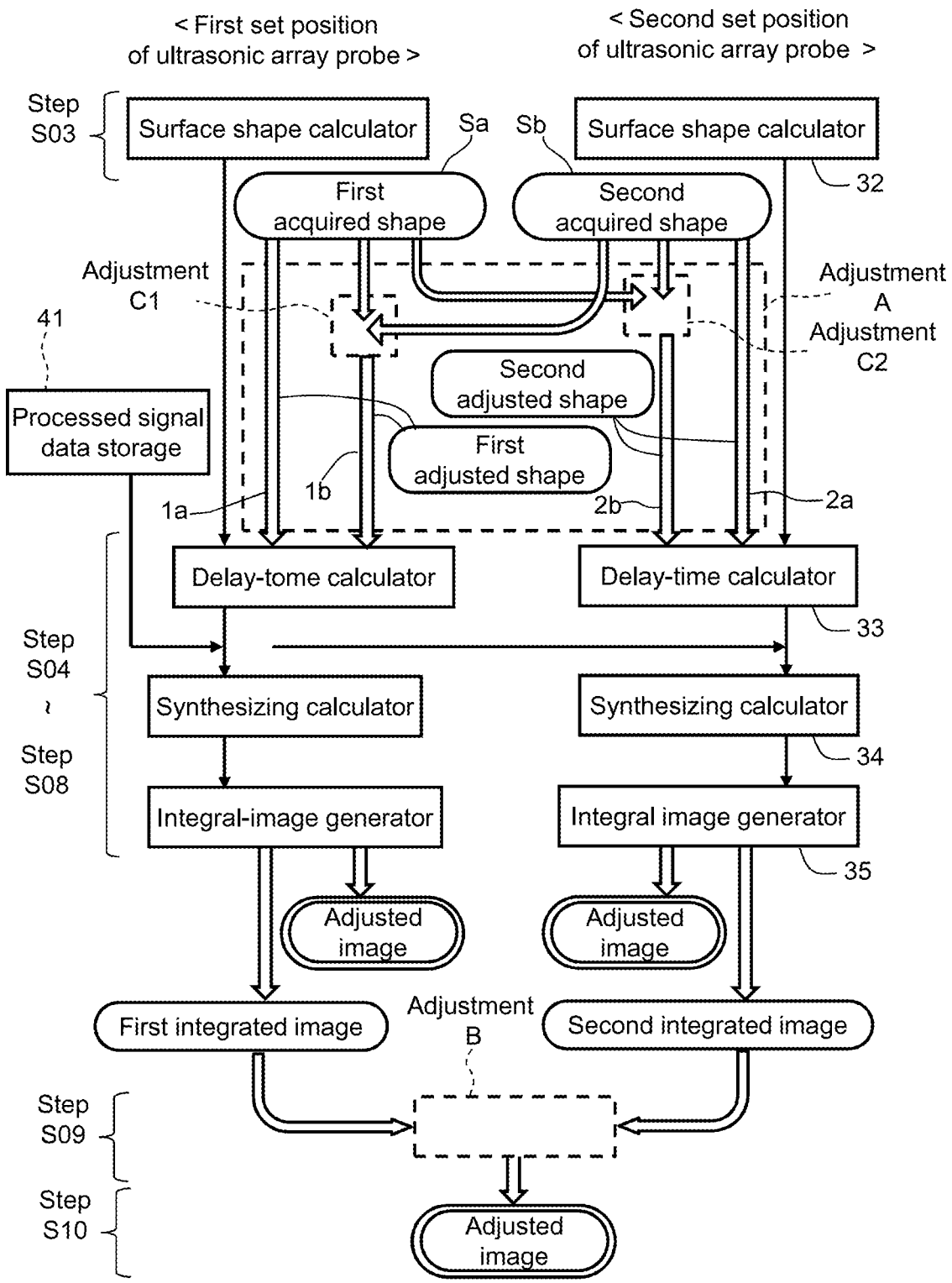
FIG. 18 is a block diagram explaining the function of the overlapping-region adjustor.

FIG. 18 is a block diagram explaining the function of the overlapping-region adjustor 36. Since FIG. 18 shows how the overlapping-region adjustor 36 performs various functions, and a specific sequence in each determined conditions by the overlapping-region adjustor 36. In FIG. 18, each of some calculation units is therefore shown as if it were two units.

The overlapping-region adjustor 36 is so configured to set the conditions of the surface shape to be referred to the delay-time calculator 33 in calculating the values of the delay time at either the first-probe setting position or the second-probe setting position as both the first acquired shape obtained at the first setting position and the second acquired shape obtained at the second-probe setting position. According to the conditions of the surface shape set with the overlapping-region adjustor 36, the delay-time calculator 33 refers to both of the first acquired shape and the second acquired shape to calculate values of the delay time at the first-probe setting position or the second-probe setting position, or both.

As shown in FIG. 18, the overlapping-region adjustor 36 works twice, by performing adjustment A and adjustment B.

Adjustment A is performed at a stage between Step S03 and Step S04. As specified above, the surface-shape calculator 32 calculates, in Step S03, the first acquired shape Sa and the second acquired shape Sb obtained respectively at the first and second-probe setting positions overlapping each other. Hence, it must be determined how the first acquired shape Sa and the second acquired shape Sb should be used to acquire an image in the mutually overlapping region of the first and second-probe setting positions.

With regard to the overlapping region, the overlapping-region adjustor 36 selects, in the adjustment A, one of three selection methods (described below) of adjusting and obtaining an adjusted shape of the overlapping region based on the first acquired shape Sa and the second acquired shape Sb.

In the first selection method, step S04 and subsequent steps are performed using both the first acquired shape Sa as a first adjusted shape and the second acquired shape Sb as a second adjusted shape, as indicated by outlined arrows 1*a* and 2*a* in FIG. 18. In this case, the first integrated image is obtained on the basis of the first acquired shape Sa, and the second integrated image is obtained on the basis of the second acquired shape Sb. Thus, two types of integrated images, namely first and second integrated images, are obtained. Therefore, in adjustment B, the overlapping-region adjustor 36 selects one of some methods (later described) of integrating images. The flowchart of FIG. 5 shows the sequence on the basis of this case.

In the second method in adjustment A, the surface shape from which values of the delay time will be calculated for the first-probe setting position including the overlapping region is estimated on the basis of both the first acquired shape Sa and the second acquired shape Sb as is indicated by the thick arrow 1*b* in FIG. 18. In this case, the overlapping-region adjustor 36 selects the first adjusted shape from some adjusted shapes in adjustment C1. The first adjusted shape selected by the overlapping-region adjustor 36 has been obtained in any method available. In one method, the first acquired shape Sa is used for the part outside the overlapping-region, and the second acquired shape Sb is used for the overlapping region, not using the first acquired shape Sa. In another method, the first acquired shape Sa and the second acquired shape Sb are averaged in the overlapping region. In a still another method, the first acquired shape Sa and the second acquired shape Sb are weighted at first and then added together. In this embodiment, the surface shape of the overlapping region is obtained in adjustment C1. Nonetheless, not only the overlapping region, but also predetermined part of the second acquired shape Sb which lies in the region of the first acquired shape Sa may be set as part that is used to select a method of acquiring the surface shape. Thus, using the end part of the second acquired shape Sb in the region of first acquired shape Sa makes it possible to obtain the first adjusted shape more correctly than otherwise. If the second method is selected, the delay-time calculator 33, the synthesizing-calculator 34 and the integrated-image generator 35 will perform calculation on the basis of the first adjusted shape only, that is set by using both the first acquired shape Sa and the second acquired shape Sb, to generate a single final adjusted image.

In the second method in adjustment A, the surface shape from which the values of the delay time will be calculated for the first-probe setting position including the overlapping region is estimated on the basis of both first acquired shape Sa and the second acquired shape Sb as is indicated by the thick arrow 2*b* in FIG. 18. In this case, the overlapping-region adjustor 36 selects the second adjusted shape from some adjusted shapes in adjustment C2. The second adjusted shape selected by the overlapping-region adjustor 36 has been obtained in any method available. In one method, the second acquired shape Sb is used for the part outside the overlapping-region, and the first acquired shape Sa is used for the overlapping region, not using the second acquired shape Sb. In another method, the first acquired shape Sa and the second acquired shape Sb are averaged in the overlapping region. In a still another method, the first acquired shape Sa and the second acquired shape Sb are weighted at first and then added together. In this embodiment, the surface shape of the overlapping region is obtained in adjustment C2. As in the second method, not only the overlapping region, but also predetermined part of the first acquired shape Sa which lies in the region of the second acquired shape Sb may be set as part that is used to select a method of acquiring the surface shape. Thus, using the end part of the first acquired shape Sa in the region of second acquired shape Sb makes it possible to obtain the second adjusted shape more correctly than otherwise. If the third method is selected, the delay-time calculator 33, the synthesizing-calculator 34 and the integrated-image generator 35 will perform calculation on the basis of the second adjusted shape only, that is set by using both the first acquired shape Sa and the second acquired shape Sb, to generate a single final adjusted image.

The second method and the third method may be selected at the same time. With regard to the first adjusted waveform, the second method may be selected for the first adjusted shape and the first method may be selected for only the second adjusted shape, or conversely, the first method may be selected for only the first adjusted shape and the third method may be selected for the second adjusted shape. If the first method is so combined with the second method or the third method, it is desirable to use an image integrated by the second or third method, not an image integrated by the first method, in order to obtain an adjusted image in adjustment B described later.

The case where the overlapping-region adjustor 36 selects the first method in adjustment A will be explained with reference to the flowchart shown in FIG. 5.

Figure 19:
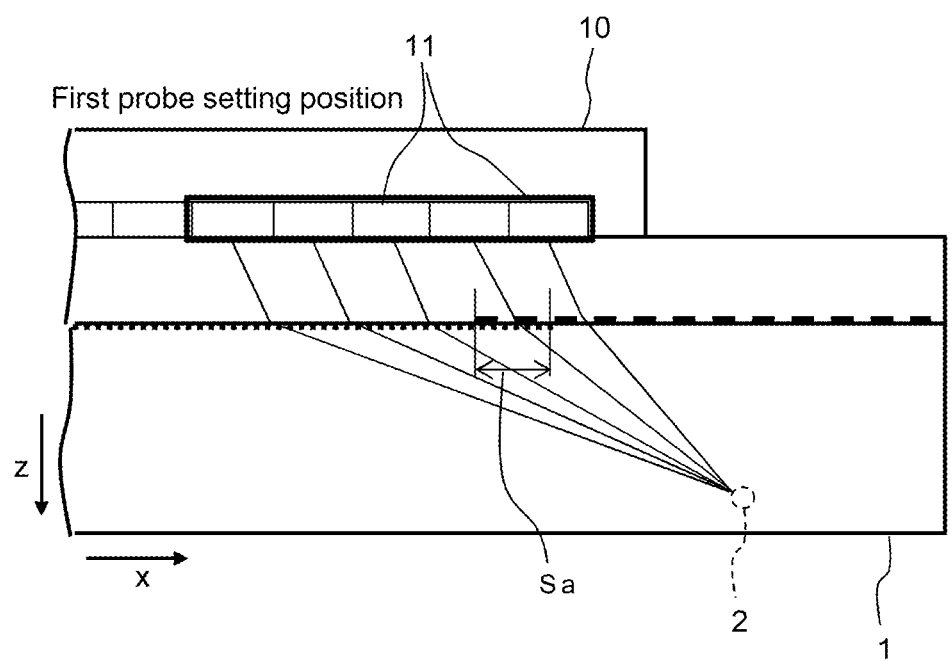
FIG. 19 is a conceptual, sectional longitudinal view illustrating how the ultrasonic waves propagate when surface shape information data about the test object are acquired at two set positions of the ultrasonic array probe.

FIG. 19 is a conceptual, sectional longitudinal view illustrating how the ultrasonic waves propagate when surface shape information data about the test object are acquired at two set positions of the ultrasonic array probe. When the overlapping part is included in the range that the lengthwise-depth test image is generated, overlapping-region adjustor 36 determines the surface shape of the overlapping part in accordance with the instructions given from outside the linear-scan ultrasonic inspection apparatus or generated within the linear-scan ultrasonic inspection apparatus.

Based on the surface shape determined by the overlapping-region adjustor 36, the integrated-image generator 35 generates the data representing a lengthwise-depth integrated image. Using this data, the display 60 displays a lengthwise-depth integrated image (Step S10).

As explained above, the conditions of calculating a lengthwise-depth test image of the overlapping region are set, thereby setting a surface shape. This embodiment is not limited to this. The conditions of calculating a lengthwise-depth test image of the overlapping region may be input from outside via the input 70, or may be held within the overlapping-region adjustor 36.

Setting of the conditions of calculating a lengthwise-depth test image of the overlapping region include, for example, selecting a lengthwise-depth image acquired by one side, selecting more appropriate lengthwise-depth test image acquired, or averaging value of these images. The more appropriate lengthwise-depth test image is, for example, an image generated by transmitting an ultrasonic wave inwards from the ultrasonic element 11 to the test object 1, namely from the N-th ultrasonic element, not from the first element (n=1) in the case illustrated in FIGS. 7 and 8.

Some examples of the conditions for generating a lengthwise-depth test image of the overlapping region will be described below.

When the ultrasonic array probe 10 is set at two or more positions, two or more lengthwise-depth ultrasonic test images are formed, each on the basis of the coordinate system of the ultrasonic array probe. Two adjacent lengthwise-depth ultrasonic test images overlap each other, forming a lengthwise-depth integrated image. The mutually overlapping parts of the lengthwise-depth ultrasonic test images form a lengthwise-depth overlapping image. The data used to display the lengthwise-depth integrated image is generated by the integrated-image generator 35.

The integrated image is a lengthwise-depth image for use in the ultrasonic inspection of the planer region extending in the x and z directions, along the center of y direction of the ultrasonic array probe 10. This image has a width in the x direction, which corresponds to the region in which the ultrasonic array probe 10 is arranged and moved. Further, this image has a width in the z direction, which corresponds to the distance between the front 1a and the back 1b of the test object 1.

While Steps S03 to S08 are performed, the ultrasonic array probe 10 at two adjacent setting positions generates two synthesized waveform data for the overlapping regions of the test object 1. These two synthesized waveform data have been obtained by calculation at the different positions and by different measurement data in Step S03. Therefore, those surface shapes calculated are not identical, and basically different from one another.

Hence, as a result from steps to Step S08, two types of lengthwise-depth integrated images are obtained for the overlapping regions of the test object 1.

In adjustment B shown in FIG. 18, the overlapping-region adjustor 36 selects one of five methods described below, and then an ultrasonic test image of the overlapping region is obtained. The five methods are no more than examples, and any other appropriate method can be used for synthesizing.

FIG. 20 is a conceptual, sectional longitudinal view explaining a first method of overlapping ultrasonic test images in the linear-scan ultrasonic inspection apparatus according to the first embodiment. In the case that first and second-probe setting positions overlap each other as shown in FIG. 20, the lengthwise-depth overlapping image has data representing the results of ultrasonic tests performed at the two positions. The results at the first-probe setting position gives a lengthwise-depth test image Ga (indicated by dotted lines). The results at the second-probe setting position gives a lengthwise-depth test image Gb (indicated by broken lines).

As for overlapping region of the lengthwise-depth test images Ga and Gb, a lengthwise-depth integrated image Gt on the basis of a synthesized wave from M is formed, and then the lengthwise-depth integrated image Gt is generated as indicated by two-dots, dashed line.

FIG. 21 is a conceptual, sectional longitudinal view explaining a second method of overlapping ultrasonic test images in the linear-scan ultrasonic inspection apparatus according to the first embodiment. In this case that the first-probe setting position and the second-probe setting position overlap each other, the lengthwise-depth overlapping image has the data about only the test result obtained from one probe-setting position. That is, the lengthwise-depth overlapping image is generated based on one of the two synthesized waveforms M. In this process, either the test result at the first-probe setting position or the test result at the second-probe setting position is selected.

The lengthwise-depth test image Gb is formed, on the basis of the result of the ultrasonic test performed at the second-probe setting position of the ultrasonic array probe 10 including the overlapping region. Further, the lengthwise-depth test image Ga is formed, on the basis of the result of the ultrasonic test performed at the first-probe setting position of the ultrasonic array probe 10 excluding the overlapping region. The lengthwise-depth test image Ga and the lengthwise-depth test image Gb constitute an lengthwise-depth integrated image Gt indicated by two-dot, dashed lines.

FIG. 22 is conceptual, sectional longitudinal view explaining a third method of overlapping ultrasonic test images in the linear-scan ultrasonic inspection apparatus according to the first embodiment. In the case that the first-probe setting position and the second-probe setting position overlap each other, a process may be performed to obtain an arithmetic average of the synthesized waveforms M or to integrate both data items such as peak hold values.

First, a synthesized waveform Ma, indicated by dotted lines located with prescribed distance da therebetween, is formed on the basis of the result of the ultrasonic test performed at the first-probe setting position. Further, a synthesized waveform Mb, indicated by broken lines located with prescribed distance db therebetween, is formed on the basis of the result of the ultrasonic test performed at the second-probe setting position. At this point, the distance da and the distance db are equalized. Further, the synthesized image Ma and the synthesized image Mb are generated at the same position. Then, the synthesized waveform Mc or the data for generating a synthesized waveform is used, integrating the data, thereby forming a lengthwise-depth integrated image Gc at the overlapping part.

FIG. 23 is conceptual, sectional longitudinal view explaining a fourth method of overlapping ultrasonic test images in the linear-scan ultrasonic inspection apparatus according to the first embodiment. As shown in FIG. 23, the synthesized waveform Ma obtained at the first-probe setting position and the synthesized waveform Mb obtained at the second-probe setting position can be displayed side by side.

First, synthesized waveforms Ma at locations with predetermined distances da therebetween as indicated by dotted lines, on the basis of the result of the ultrasonic test performed at the first-probe setting position. Further, synthesized waveforms Mb at locations with predetermined distances db therebetween as indicated by broken lines, on the basis of the result of the ultrasonic test performed at the second-probe setting position. In this process, the synthesized waveforms Ma are formed at positions different from those of the synthesized waveforms Mb, particularly in the overlapping region. As a result, a synthesized waveform Mc includes both of the synthesized waveforms Ma and Mb at the overlapping region. A lengthwise-depth test image Gc at the overlapping part is formed by using the synthesized waveforms Ma and Mb.

FIG. 24 is conceptual, sectional longitudinal view explaining a fifth method of overlapping ultrasonic test images in the linear-scan ultrasonic inspection apparatus according to the first embodiment.

After the ultrasonic test result such as synthesized waveform Ma1 shown by the dotted lines is obtained at the A1-probe setting position of the ultrasonic array probe 10, ultrasonic-test result data such as synthesized waveform Ma2 shown by solid lines is obtained at the A2-probe setting position. The A2-probe setting position is shifted from the A1-probe setting position by half the pitch at which the ultrasonic elements 11 are arranged. A synthesized waveform can therefore be obtained in a density twice as high as in the case where only the A1-probe setting position is used.

Similarly, after the ultrasonic test result such as synthesized waveform Mb1 shown by the broken lines is obtained at the B1-probe setting position partly overlapping the A1-probe setting position, ultrasonic-test result data such as synthesized waveform Mb2 shown by two-dot dashed lines is obtained at the B2-probe-setting position shifted by half the pitch at which the ultrasonic elements 11 are arranged. Hence, a synthesized waveform can be obtained in density twice as high as in the case where only the B1-probe setting position is used.

Images can be integrated by any one of the methods described above. Any method described above can generate a lengthwise-depth integrated image Gt having sound rays in pseudo-density twice as high.

Figure 25:
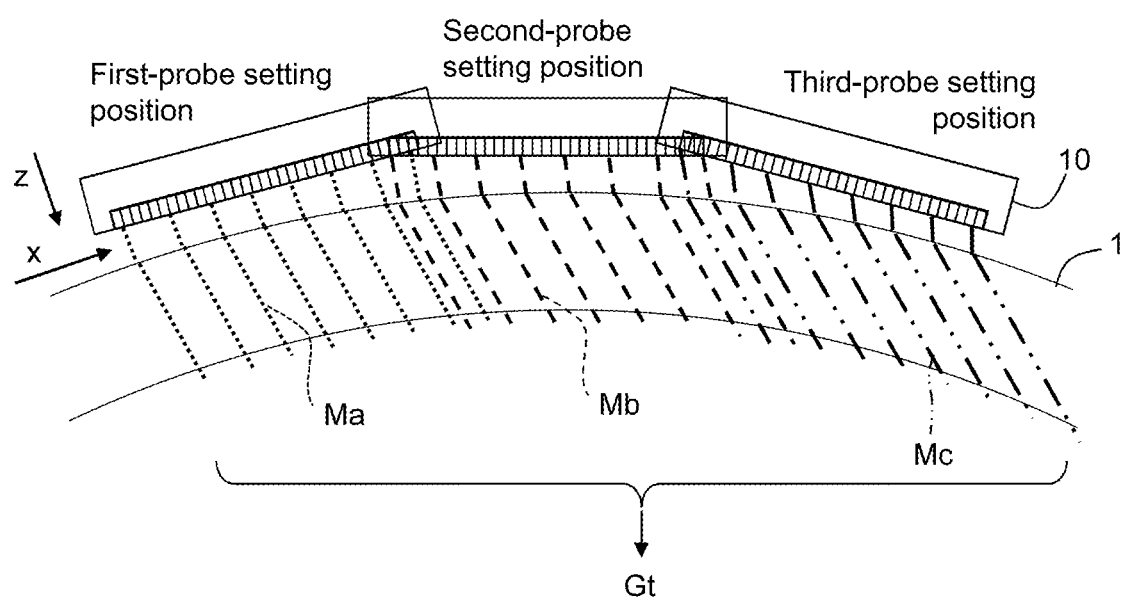
FIG. 25 is a conceptual, sectional longitudinal view explaining the first ultrasonic inspection method for testing a test object having a curved surface, by using the linear-scan ultrasonic inspection apparatus according to the first embodiment.

FIG. 25 is a conceptual, sectional longitudinal view explaining the first ultrasonic inspection method for testing a test object having a curved surface, by using the linear-scan ultrasonic inspection apparatus according to the first embodiment.

The probe-setting position of the ultrasonic array probe 10 is moved in the circumferential direction of the test object 1. The ultrasonic array probe 10 acquires a synthesized waveform Ma at a first-probe setting position, a synthesized waveform Mb at a second-probe setting position, and a synthesized waveform Mc at a third probe-setting position.

The synthesized waveform Ma, the synthesized waveform Mb and the synthesized waveform Mc are aligned in the same direction in the test object 1. Therefore, the lengthwise-depth integrated image Gt is drawn, having parallel sound rays in the test object 1, on the basis of the inspection refraction angle at the reference position (e.g., the second-probe setting position) of the ultrasonic array probe 10, no matter where the ultrasonic array probe 10 is positioned.

Figure 26:
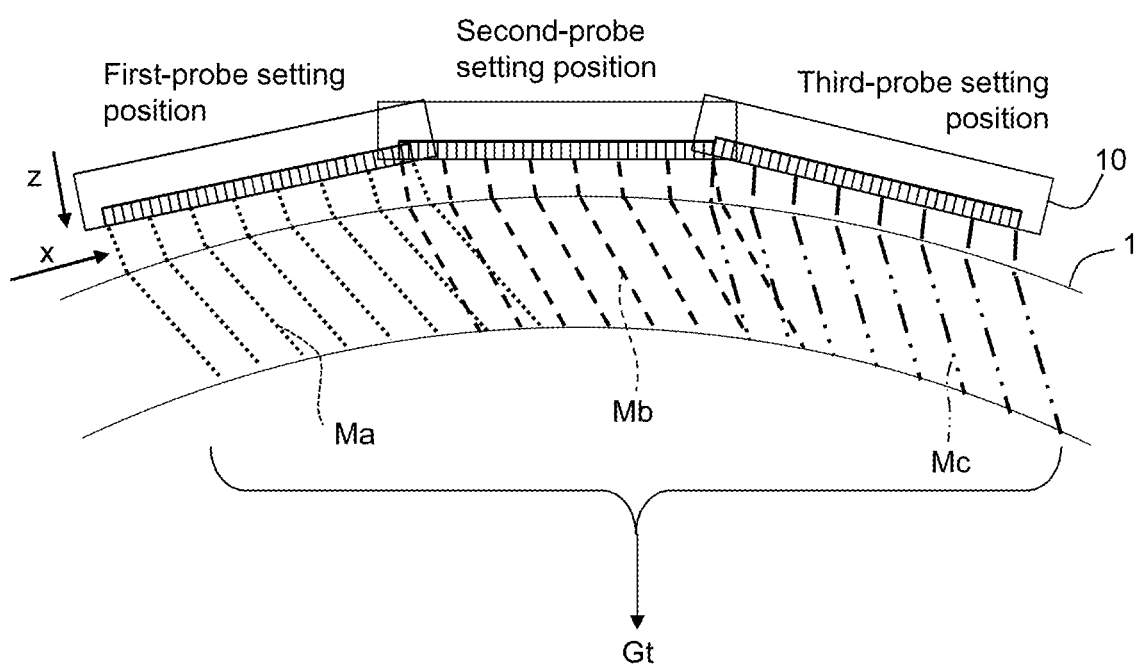
FIG. 26 is a conceptual, sectional longitudinal view explaining the second ultrasonic inspection method for testing a test object having a curved surface, by using the linear-scan ultrasonic inspection apparatus according to the first embodiment.

FIG. 26 is a conceptual, sectional longitudinal view explaining the second ultrasonic inspection method for testing a test object having a curved surface, by using the linear-scan ultrasonic inspection apparatus according to the first embodiment.

In FIG. 26, the parallel sound rays are uniformly illustrated in the direction of refraction which is defined for each of the positions of the ultrasonic array probe 10.

In the case illustrated in FIG. 25 and FIG. 26, if the result at a reference position is displayed and designated for the ultrasonic array probe 10 in order to display a lengthwise-depth integrated image Gt, the results at other positions of the ultrasonic array probe 10 also may be designated simultaneously. It is, of course, possible to set the ultrasonic-inspection refraction angle at each position of the ultrasonic array probe 10.

According to this embodiment as described above, even if a ultrasonic array probe 10 has a few channels only, the linear-scan ultrasonic inspection apparatus 100 can generate an entire image achieving linear scanning of a broad area, by moving the ultrasonic array probe 10 while forming an overlapping region and by adjusting adequately the image of the overlapping region.

Second Embodiment

Figure 27:
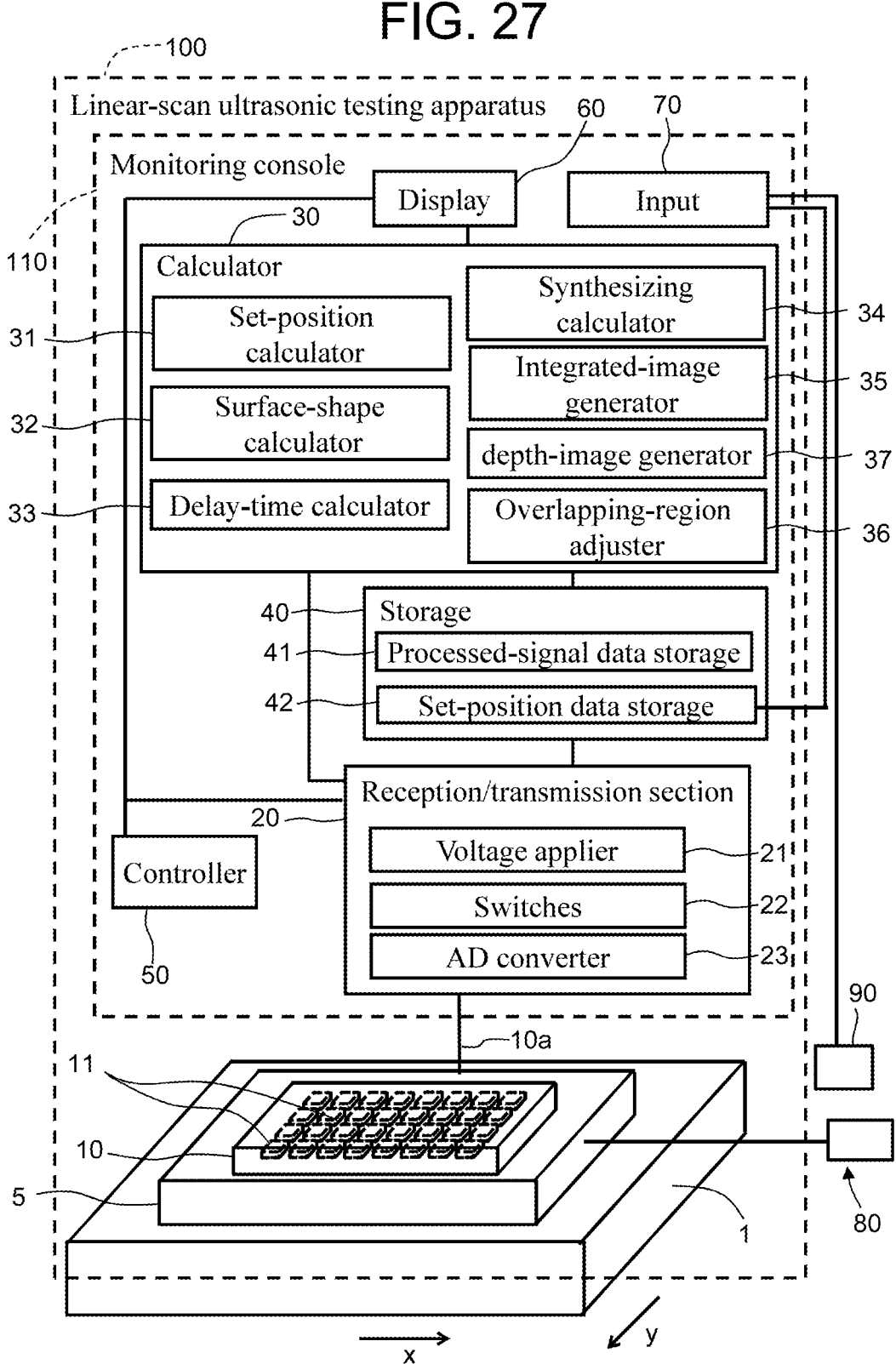
FIG. 27 is a block diagram showing the configuration of a linear-scan ultrasonic inspection apparatus according to a second embodiment.

FIG. 27 is a block diagram showing the configuration of a linear-scan ultrasonic inspection apparatus according to a second embodiment.

This embodiment is a modification of the first embodiment. In the first embodiment, the ultrasonic array probe 10 has a plurality of ultrasonic elements 11 arranged in the x direction (first direction). In the second embodiment, the ultrasonic array probe 10 has a plurality of ultrasonic elements 11 arranged in the x direction and the y direction (second direction), forming a two-dimensional pattern. That is, they form a two-dimensional array (e.g., matrix array), and ultrasonic beams can be controlled in the depth direction, too. The switches 22 therefore turn on and off the ultrasonic elements 11 in a two-dimensional fashion. The calculator 30 further has a depth-image generator 37. The display 60 can therefore display the depth image. In other respects, the second embodiment is identical to the first embodiment.

Figure 28A:
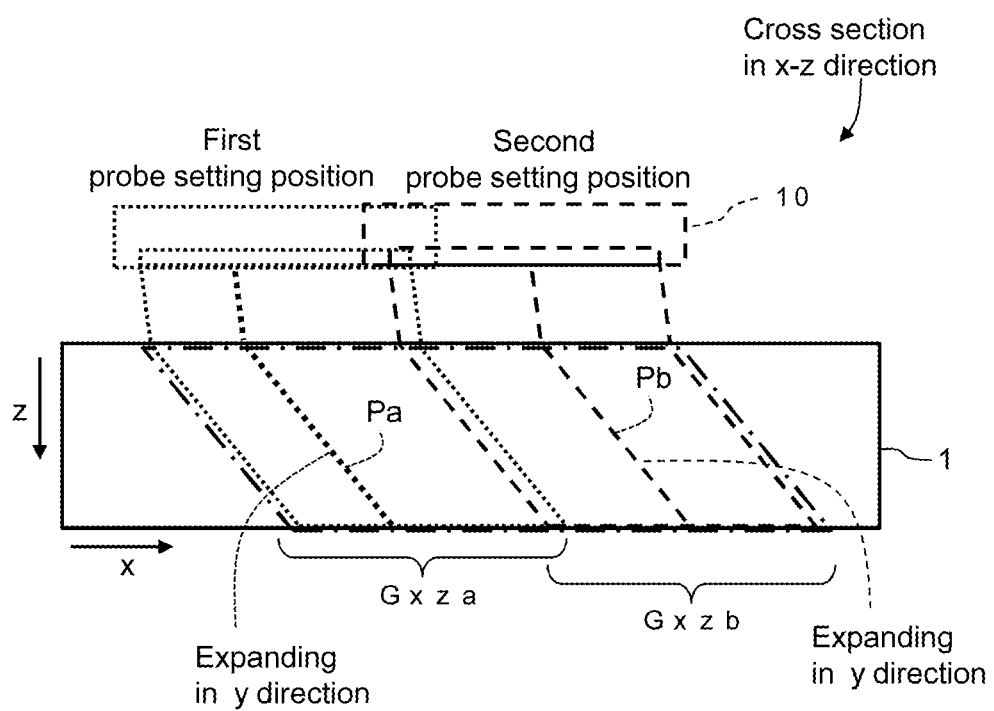
FIG. 28A shows a lengthwise-depth test image including x-z direction cross section.
Figure 28B:
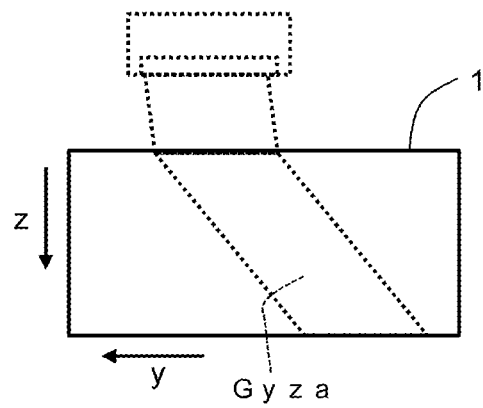
FIG. 28B shows a widthwise-depth test image Gyza which includes a synthesized waveform M existing in a part of the lengthwise-depth image Gxza and which is parallel to the y axis.
Figure 28C:
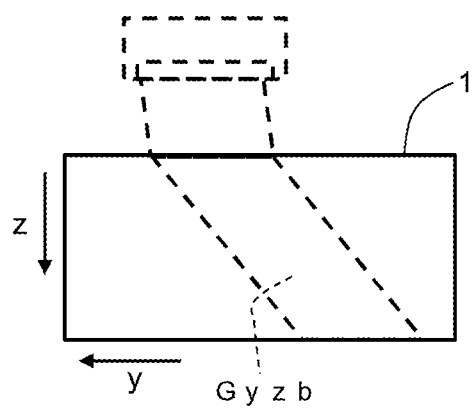
FIG. 28C shows a widthwise-depth test image Gyzb which includes a synthesized waveform M existing in a part of the lengthwise-depth test image Gxzb and which is parallel to y axis.

FIGS. 28A, 28B and 28C are conceptual views explaining the lengthwise-widthwise-depth test images of the first example. The linear-scan ultrasonic inspection apparatus 100 according to this embodiment, which is shown in FIG. 27, the ultrasonic array probe 10 can scan the test object not only in the x direction, but also in the y direction. FIGS. 28A, 28B and 28C show the case where the test object is scanned with parallel beams as in the linear scanning.

The depth-image generator 37 generates widthwise-depth image data in order to display a test image Gyz which expands in the y and z directions (namely, y-z cross-sectional image), in the same way as the integrated-image generator 35 generates lengthwise-depth test image data in order to display a test image which expands in the x and z directions (namely, x-z cross-sectional image).

As a result, in the second embodiment, three-dimensional test image data is generated for that region of the test object 1, which has been scanned. The test image data is stored in the processed-signal data storage 41.

FIG. 28A shows a lengthwise-depth test image including x-z direction cross section. That is, FIG. 28A shows a lengthwise-depth image Gxza at the first-probe setting position the ultrasonic array probe 10 assumes, and a lengthwise-depth image Gxzb at the second-probe setting position the second ultrasonic array probe 10 assumes. The integrated-image generator 35 reads the test image data representing the x-z cross section, from the processed-signal data storage 41, and generates lengthwise-depth image data. The display 60 displays the lengthwise-depth image.

The lengthwise-depth image Gxza and the lengthwise-depth image Gxzb partly overlap, having a mutually overlapping part each. For the overlapping parts, the overlapping-region adjustor 36 determines the conditions of generating in which the integrated-image generator 35 generates data for the lengthwise-depth test image Gxzd.

FIG. 28B shows a widthwise-depth test image Gyza which includes a synthesized waveform M existing in a part of the lengthwise-depth image Gxza and which is parallel to the y axis. The widthwise-depth test image Gyza is formed not in the y-z plane, but in a plane that inclines to the y-z plane. However, it is called "image Gyza" for sake of convenience. That is, the widthwise-depth test image Gyza is obtained by projecting, in the x direction, an image perpendicular to the x-z plane and expanding in the plane including sound rays Pa.

FIG. 28C is similar to FIG. 28B and shows a widthwise-depth test image Gyzb which includes a synthesized waveform M existing in a part of the lengthwise-depth test image Gxzb and which is parallel to y axis. Like the widthwise-depth test image Gyza, the widthwise-depth test image Gyzb is obtained by projecting, in the x direction, an image perpendicular to the x-z plane and expanding in the plane including sound rays Pb.

Figure 29A:
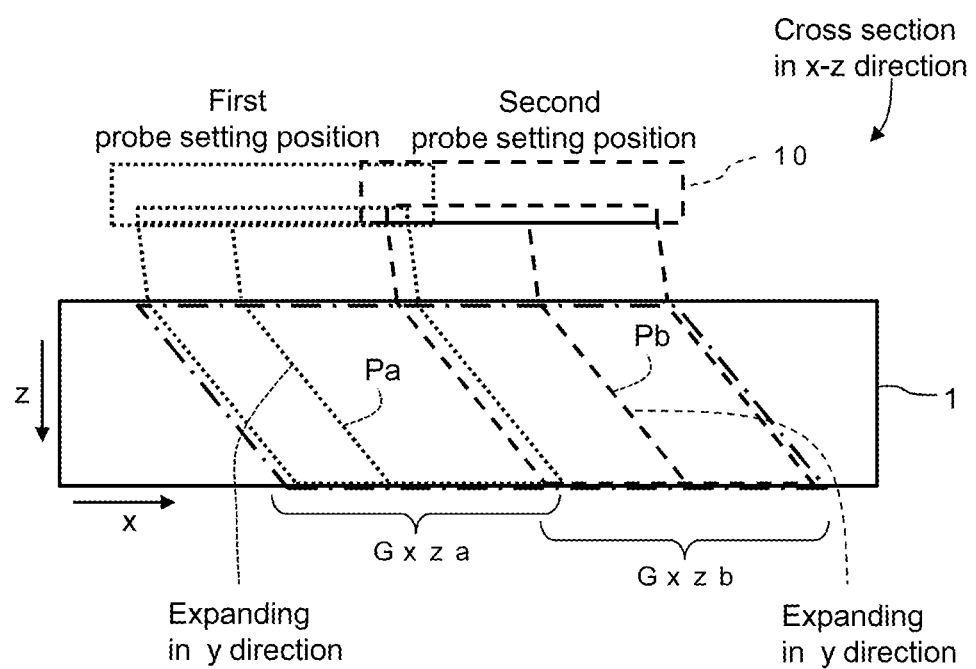
FIGS. 29A, 29B and 29C are conceptual views explaining the lengthwise-depth and widthwise-depth test images of the second example.
Figure 29B:
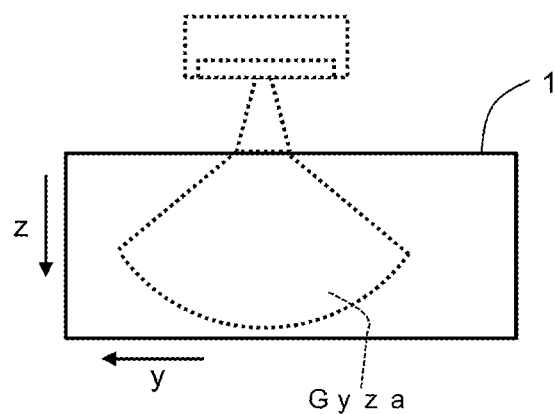
Figure 29C:
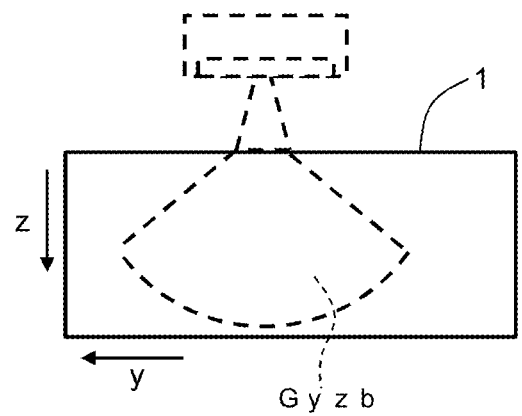

FIGS. 29A, 29B and 29C are conceptual views explaining the lengthwise-depth and widthwise-depth test images of the second example. FIGS. 29A, 29B and 29C show test images as shown in FIGS. 28A, 28B and 28C but obtained by scanned with fan-shaped beams.

Figure 30:
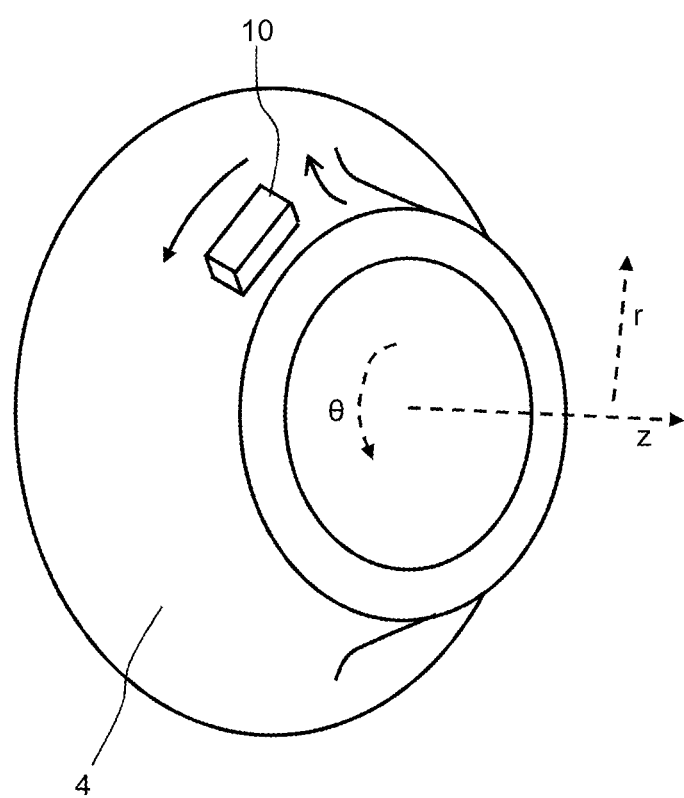
FIG. 30 is a conceptual, perspective view showing a nozzle used in the linear-scan ultrasonic inspection apparatus according to this embodiment.

FIG. 30 is a conceptual, perspective view showing a nozzle used in the linear-scan ultrasonic inspection apparatus according to this embodiment. As shown In FIG. 30, the nozzle 4 has its rotation axis extending in the z direction, and has a radial direction r and a circumferential direction θ.

The root of the nozzle 4 has a three-dimensionally curved surface. The ultrasonic array probe 10 is positioned, having its lengthwise direction set in the circumferential direction θ of the nozzle 4. The ultrasonic array probe 10 is shifted in the direction θ, defining regions mutually overlapping at one position in the z direction. Then, every time the probe 10 has made a circuit in the direction θ, it is then shifted in the z direction, defining a region overlapping the region previously defined. The probe 10 thus examines the nozzle 4 as needed, after repeating those steps.

Figure 31:
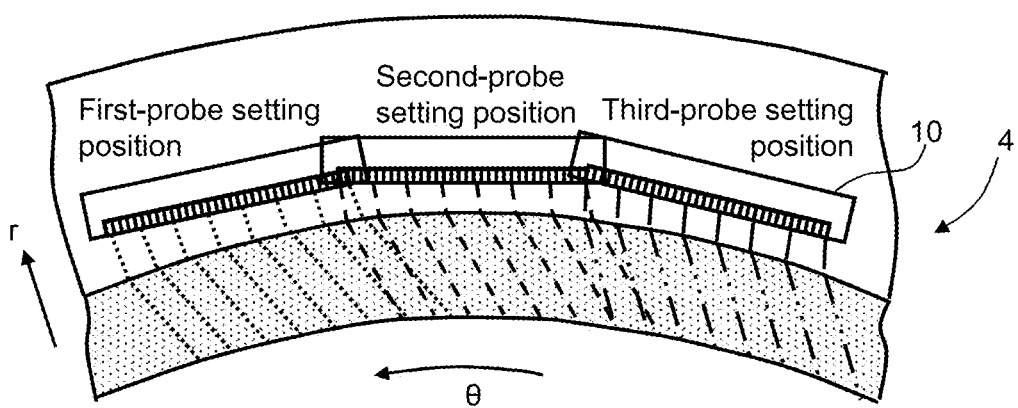
FIG. 31 is a conceptual view explaining how the nozzle is examined in its circumferential direction.
Figure 32:
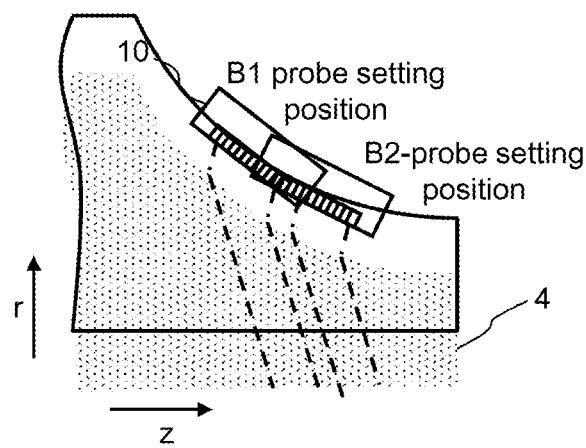
FIG. 32 is conceptual view explaining how the ultrasonic array probe is moved in the axial direction of the nozzle.

FIG. 31 is a conceptual view explaining how the nozzle is examined in its circumferential direction. More specifically, FIG. 31 illustrates how the ultrasonic array probe 10 is moved on the nozzle in the directions r and θ to the first-probe setting position, second-probe setting position (reference position) and the third probe-setting position. FIG. 32 is conceptual view explaining how the ultrasonic array probe is moved in the axial direction of the nozzle. That is, FIG. 32 shows how the ultrasonic array probe 10 is moved in the r and θ directions to perform its function at probe-setting positions B1 and B2 spaced apart in r and z directions.

The integrated-image generator 35 calculates the image data in the θ-direction. The depth-image generator 37 calculates the image data in the z-direction. The overlapping-region adjustor 36 determines the conditions of adjusting the regions overlapping in the 0 direction, and outputs these conditions to the integrated-image generator 35. The overlapping-region adjustor 36 further determines the conditions of adjusting the regions overlapping in the z direction, and outputs these conditions to the depth-image generator 37.

The conditions of adjusting the overlapping region may be determined by selecting from various methods. In one method, the values of the delay time are calculated from the surface shape determined at one probe-setting position. In another method, overlapping images are formed by using the synthesized waveforms obtained at both probe-setting positions. In still another method, the synthesized waveforms obtained at both probe-setting positions and located at the same position are synthesized with each other. One of these methods, which is considered the most appropriate, is selected in accordance with the various conditions received from outside via the input 70 or stored in the overlapping-region adjustor 36.

As described above, the linear-scan ultrasonic inspection apparatus 100 according to the second embodiment can perform a three-dimensional linear scanning, by using an ultrasonic array probe that has a smaller number of channels.

Other Embodiments

While the embodiments of the present invention have thus been described, the embodiments are presented as examples and are not intended to limit the scope of the invention. For example, although a horizontal induction rotating electrical machine is exemplified in the above embodiments, the present invention may be applied to a vertical one. Further, the present invention may be applied not only to the induction rotating electrical machine, but also to a synchronous rotating electrical machine. Further, while a fully-closed type rotating electrical machine is exemplified in the above embodiments, the present invention may be applied to an open-type rotating electrical machine. That is, the present invention produces, in an annular space sandwiched between the rotor core and the stator core, a fan effect generated by rotation of the rotor core, and this effect does not depend on a difference in these types of the rotating electrical machine.

Furthermore, the above-described embodiments may be put to use in various different ways and, if appropriate, any of the components thereof may be omitted, replaced or altered in various different ways without departing from the spirit and scope of the invention. All the above-described embodiments and the modifications made to them are within the spirit and scope of the present invention, which is specifically defined by the appended claims, as well as their equivalents.

What is claimed is:

1. A linear-scan ultrasonic inspection apparatus comprising:
    an ultrasonic array probe having a plurality of ultrasonic elements aligned in a first direction, each of the ultrasonic elements being configured to transmit and receive ultrasonic wave in a test object;
    an input to receive both of locating-position information data and shape information data from outside, and to receive data including physical property data and acoustic characteristic data for calculation from outside;
    a surface-shape calculator, implemented by circuitry, configured to receive the locating-position information data and the shape information data received by the input, and to calculate an acquired shape as a shape of a surface of the test object;
    a delay-time calculator, implemented by the circuitry, configured to receive the shape information data of the test object, the physical property data, the acoustic characteristic data received by the input, and the acquired shape calculated by the surface-shape calculator, to calculate a value of delay time for transmitting to a focus point and receiving the ultrasonic wave, and to output the delay time;
    a synthesizing-calculator, implemented by the circuitry, configured to receive the delay time from the delay-time calculator and digital ultrasonic waveform data, and to generate a synthesized signal using the delay time;
    an overlapping-region adjustor, implemented by the circuitry, configured to receive a first acquired shape at a first-probe locating position and a second acquired shape at a second-probe locating position calculated by the surface-shape calculator, to set a surface shape of an overlapping region of a first-probe locating position and a second-probe locating position for the synthesizing-calculator, and to output the surface shape as an adjusted shape to the synthesizing-calculator; and
    an integrated-image generator, implemented by the circuitry, configured to receive the synthesized signal generated by the synthesizing-calculator, the adjusted shape output by the overlapping-region adjustor, the locating-position information data and the shape information data of the test object, to decide an ultrasonic-beam path along the first direction based on the locating-position information data and the shape information data, to generate and output a first image data of a region including the overlapping region, the first image data expanding in the first direction and the depth direction of the test object,
    wherein the overlapping-region adjustor is configured to set conditions of the surface shape to be referred to the delay-time calculator in calculating the values of the delay time at either the first-probe locating position or the second-probe locating position as both of a first acquired shape obtained at the first-probe locating position and a second acquired shape obtained at the second-probe locating position.

2. The linear-scan ultrasonic inspection apparatus according to claim 1, wherein the overlapping-region adjustor uses a first synthesized waveform obtained at the first-probe locating position and a second synthesized waveform obtained at the second-probe locating position.

3. The linear-scan ultrasonic inspection apparatus according to claim 2, wherein the second-probe locating position is so set that a path of an ultrasonic-wave beam having the second synthesized waveform overlaps a path of an ultrasonic-wave beam having the first synthesized waveform.

4. The linear-scan ultrasonic inspection apparatus according to claim 1, wherein the overlapping-region adjustor obtains the first acquired shape and the second acquired shape based on ultrasonic test data transmitted from the ultrasonic array probe.

5. The linear-scan ultrasonic inspection apparatus according to claim 1, further comprising a shape acquiring unit including cameras located axially outside the ultrasonic array probe, to acquire and to output, to the surface-shape calculator, the shape information data and information on positional relation between the test object and the ultrasonic array probe.

6. The linear-scan ultrasonic inspection apparatus according to claim 1, further comprising an array probe driver to set the ultrasonic array probe at a probe-locating position where the ultrasonic array probe scans the test object and to drive the ultrasonic array probe between the probe-locating positions.

7. The linear-scan ultrasonic inspection apparatus according to claim 1, wherein
the ultrasonic array probe has a plurality of ultrasonic elements arranged in the first direction and in a second direction different from the first direction, forming a two-dimensional array; and the linear-scan ultrasonic inspection apparatus further comprises a second image generator configured to generate second image data expanding in the direction perpendicular to the first direction.

8. A linear-scan ultrasonic inspection method comprising:
storing in a non-transitory storage a first inspection data obtained by an ultrasonic array probe having a plurality of ultrasonic elements at a first-probe locating position on a surface of a test object;
storing in the non-transitory storage a second inspection data obtained by the ultrasonic array probe at a second-probe locating position including an overlapping region overlapping the first-probe locating position in a first direction along the surface of the test object;
setting in an overlapping-region adjustor a surface shape of the test object as a condition of generating image data for the overlapping region; and
generating with an integrated-image generator inspection image data corresponding to the first-probe locating position and the second-probe locating position including an adjusted overlapping region and a synthesized signal, based on the first ultrasonic test data, the second ultrasonic test data and the condition, wherein
the generating includes calculating with a delay-time calculator values of delay time of at least one of transmitting and receiving ultrasonic wave in the test object to a focus point with each of the ultrasonic elements, referring to the surface shape of the test object, and generating the synthesized signal using the delay time, and
the setting includes setting the condition of the surface shape to be referred to the delay-time calculator in calculating the values of the delay time at either the first-probe locating position or the second-probe locating position as both of a first acquired shape obtained at the first-probe locating position and a second acquired shape obtained at the second-probe locating position.

* * * * *